United States Patent [19]

Gudmestad et al.

[11] 4,166,315

[45] Sep. 4, 1979

[54] WIRE GATHERING MECHANISM FOR WIRE LEAD PRODUCTION APPARATUS

[75] Inventors: Ragnar Gudmestad, West Allis; Gerald E. Blaha, Waukesha, both of Wis.

[73] Assignee: Artos Engineering Company, New Berlin, Wis.

[21] Appl. No.: 912,717

[22] Filed: Jun. 5, 1978

[51] Int. Cl.[2] ........................ H01R 43/04; H02G 1/12

[52] U.S. Cl. .................................. 29/564.4; 29/564.6; 29/753; 29/759; 83/151; 198/653; 414/751; 81/9.51

[58] Field of Search .................... 29/33 F, 33 K, 33 P, 29/33 M, 564, 564.1, 564.3, 564.4, 564.6, 564.8, 628, 753, 759; 83/151, 158, 206, 277, 623, 580; 198/653, 479, 694; 214/1 BA; 140/1, 140, 147; 81/9.51

[56] References Cited

U.S. PATENT DOCUMENTS

| | | | |
|---|---|---|---|
| 3,653,412 | 4/1972 | Gudmestad | 140/1 |
| 3,875,662 | 4/1975 | Folk | 29/753 X |
| 3,918,330 | 11/1975 | Blaha | 81/9.51 |
| 4,077,118 | 3/1978 | McKeever | 29/753 X |

*Primary Examiner*—Gil Weidenfeld

*Attorney, Agent, or Firm*—James E. Nilles

[57] ABSTRACT

Apparatus for high-speed production of sets of accurately and identically sized insulated wire leads having wire terminals at the lead ends comprises: conveyor clamps for releasably gripping and conveying sets of wire segments arranged in parallel spaced apart relationship in a common generally horizontal plane; conveyor means for advancing the conveyor clamps and sets of wire segments therein through processing mechanisms and to a collecting station; processing mechanisms including wire cutter and stripper mechanisms for accurately trimming both ends of the wire segments in the sets simultaneously and for stripping insulation therefrom simultaneously and terminal attachment mechanisms for simultaneously attaching terminals to both ends of the wire segments in the sets; and a wire gathering mechanism for each processing mechanism for accurately guiding the ends of the sets of wire segments therethrough and for holding the sets against displacement during processing.

9 Claims, 38 Drawing Figures

WIRE GATHERING MECHANISM FOR WIRE LEAD PRODUCTION APPARATUS

BACKGROUND OF THE INVENTION

1. Field of Use

This invention relates generally to apparatus for producing electrical wire leads. In particular, it relates to apparatus for high-speed production of sets of accurately and identically sized insulated wire leads having electrical terminals on the ends thereof, and especially to a wire gathering mechanism for use with a processing mechanism in such apparatus.

2. Description of the Prior Art

Various types of apparatus exist for mass production of insulated electrical wire leads having electrical terminals attached to one or both ends of each lead. Such apparatus typically includes a reel of wire, a feed mechanism for drawing a strand of wire from the reel, a severing mechanism for cutting a wire segment of predetermined length from the strand, a conveyor mechanism having releasable conveyor clamps for gripping the wire segment and for conveying it to a wire stripping mechanism wherein one or both ends are stripped of insulation and then to a terminal attachment mechanism wherein electrical terminals are attached to one or both stripped ends of the wire segment, whereupon the finished lead is conveyed to a collecting station and the conveyor clamps open to deposit the finished lead thereat.

The following three U.S. patents, assigned to the same assignee as the present application, disclose apparatus and mechanisms of the aforesaid character. U.S. Pat. Nos. 3,701,301 and 3,918,330, for example, disclose apparatus for manufacturing individual wire leads from a single reel of wire and this apparatus includes a wire feed mechanism employing two counter-reciprocating feed clamps and a conveyor mechanism having releasable conveyor clamps thereon. U.S. Pat. No. 3,703,954 also discloses and claims a conveyor mechanism having releasable conveyor clamps. U.S. Pat. No. 3,274,664 discloses a terminal attachment mechanism for automatically feeding and attaching wire terminals from a continuous ribbon to the ends of successively presented wire segments.

It is desirable to increase the productive capacity of apparatus for producing electrical wire leads and also to reduce the manufacturing costs of such leads. Experience has shown, however, that apparatus constructed to simultaneously process two or more wire segments requires processing mechanisms which are relatively complicated in construction and operation, costly to manufacture, and prone to malfunction during high-speed production runs. For example, in the type of apparatus shown in the aforementioned U.S. Pat. Nos. 3,918,330, 3,701,301, and 3,703,954, each of the conveyor clamps comprises a pair of jaws which extend upwardly and open and close in a vertical plane and are adapted to grip and convey a single wire segment which extends perpendicularly to the aforesaid vertical plane. If an attempt is made to convey two or more wire segments in such a conveyor clamp for simultaneous processing, the wire segments are disposed one above another in a vertical plane and conveyed in a horizontal plane. As a result, the movable operating components in the processing mechanisms (such as cutters, strippers, and terminal attachment mechanisms) must act or move horizontally (i.e., in the same planes of movement of the several wire segments), rather than vertically, in order to have simultaneous access to the several wire segments. As a result, the construction and operation of the processing mechanisms to be used in such apparatus becomes very complicated. Consequently, there has been a practical limit on the quantity of wire leads that can be simultaneously processed and a limit on the speed at which leads can be reliably manufactured. Furthermore, problems of quality control arise in connection with terminal attachment to small gauge wire, such as 27 gauge wire, which need to be overcome, especially in high-speed apparatus.

SUMMARY OF THE INVENTION

Apparatus in accordance with the invention carries out high-speed efficient production of successive sets of accurately and identically sized wire leads having electrical terminals at the ends thereof, each set comprising a plurality of wire leads. The apparatus simultaneously draws a plurality of strands of insulated wire from a source, such as a plurality of wire reels; straightens and arranges the strands in parallel spaced apart relationship in a common horizontal plane; simultaneously severs a set of so-arranged wire segments of predetermined length from the strands; conveys the set to processing mechanisms, each having an associated gathering mechanism for accurately positioning the set, wherein the ends of the wire segments in the set are simultaneously trim cut to a high degree of accuracy to facilitate subsequent automatic high-speed attachment of electrical terminals, simultaneously stripped of insulation, and simultaneously provided with electrical terminals; and deposits the set of finished leads at a collecting station.

More specifically, the apparatus comprises: a wire dispensing mechanism, including a plurality of wire reels having wire thereon, for supplying a plurality of separate strands of insulated wire; a feed mechanism including counter-reciprocating wire feed clamps for simultaneously drawing a plurality of separate strands of insulated wire from the wire reels; a mechanism for simultaneously straightening and arranging the strands drawn therethrough in parallel spaced apart relationship in a common generally horizontal plane; a severing mechanism for simultaneously severing a set of wire segments of predetermined length from the strands while the set is still held by the wire feed clamps; releasable conveyor clamps for gripping and receiving the set of wire segments from the feed clamps and for conveying the set of wire segments; and a conveyor for advancing the conveyor clamps and set of wire segments therein through processing mechanisms and to a collecting station. The apparatus further includes conveyor clamp actuator mechanisms near opposite ends of the conveyor means for causing the conveyor clamps to initially receive sets of wire segments from the feed clamps for conveyance and to subsequently release the sets of finished leads for deposit at the collecting station. The processing mechanisms include wire cutter and stripper mechanisms, one on each side of the conveyor, for accurately trimming both ends of the wire segments in each set simultaneously and for stripping insulation therefrom simultaneously; and terminal attachment mechanisms, one on each side of the conveyor, for simultaneously attaching terminals to both ends of the wire segments in each set. The apparatus also comprises a wire gathering mechanism for each processing mechanism for accurately guiding and positioning the ends of the wire segments in each set therein and for holding the ends against displacement during processing.

The improved apparatus and processing mechanisms for use therein in accordance with the invention are capable of rapidly and efficiently producing greater numbers of wire leads, especially small-gauge wire leads, and the apparatus and mechanisms are relatively more simple in construction and operation than prior art mechanisms. The apparatus and mechanisms therein reduce the number of rejects and wastage during wire lead production caused by improperly formed connections between the ends of the wire segments and the electrical terminals connected thereto, and also improve the quality (i.e., the mechanical and electrical properties) of the connection between the end of a wire segment and the wire terminal attached thereto, while producing sets of wire leads at extremely high production rates.

Broadly considered, apparatus in accordance with the invention for high-speed production of sets of accurately and identically sized wire leads comprises: at least one processing mechanism; a conveyor clamp including a body and a relatively movable jaw for releasably gripping and conveying a set of wire segments arranged in parallel spaced apart relationship in a common generally horizontal plane; conveyor means for advancing the conveyor clamp and moving the set of wire segments therein through the processing mechanism; and a wire gathering mechanism disposed between the clamp and the processing mechanism for accurately guiding the ends of the set of wire segments relative to the processing mechanism and for holding the set against displacement during processing.

The wire gathering mechanism is disposed between the clamp and the processing mechanism for accurately guiding the ends of the set of wire segments relative to the processing mechanism and for holding the set against displacement during processing. The gathering mechanism includes guide means for guiding the ends of the set of wire segments into the processing mechanism, a releasably closable slotted gathering head for receiving and spacing the ends of the set of wire segments in the processing mechanism, means for engaging the clamp and for preventing horizontal lateral displacement thereof, and means for compressing the relatively movable components of said clamp, namely the body and jaw, against the set of wire segments to prevent the processing mechanism from effecting axial movement of the wire segments. The processing mechanism may be a cutter and stripper mechanism, or a terminal attachment mechanism. The conveyor means moves the clamp along a path which extends in the same general direction as the aforesaid horizontal plane.

In the case of the cutter and stripper mechanism, the latter is located adjacent but spaced from said path and comprises cutter and stripper blades reciprocably movable in a direction transverse to said path and to said plane, and the stripper blades are also further movable in a direction toward and away from said path. The cutter and stripper mechanism further comprises first means for effecting said reciprocable movement of the blades and second means for effecting said further movement of said stripper blades.

The gathering mechanism, which is disposed between the cutter and stripper mechanism and said path, includes the aforementioned guide means for guiding the free ends of the wires into the cutter and stripper mechanism, the aforementioned releasably closable slotted gathering head for receiving and spacing the free ends of the wire segments in the cutter and stripper mechanism, the aforementioned means for engaging the clamp and for preventing horizontal lateral displacement thereof, and the aforementioned means for compressing the relatively movable components of the clamp against the wire segments to prevent the stripper blades from effecting axial movement of the segments.

DESCRIPTION OF A PREFERRED EMBODIMENT

General Arrangement

Figure 1:
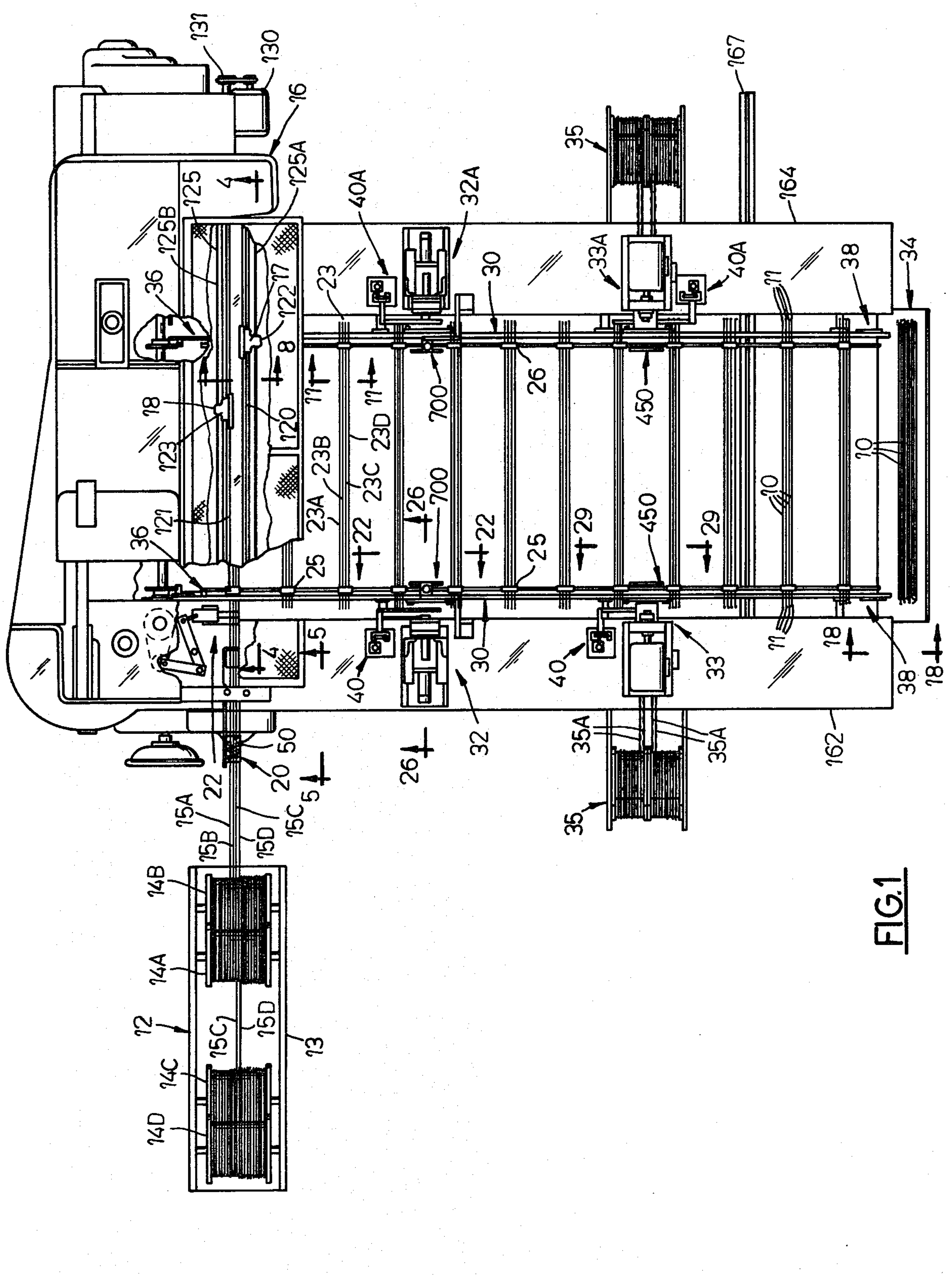
FIG. 1 is a top plan view of apparatus in accordance with the present invention.
Figure 2:
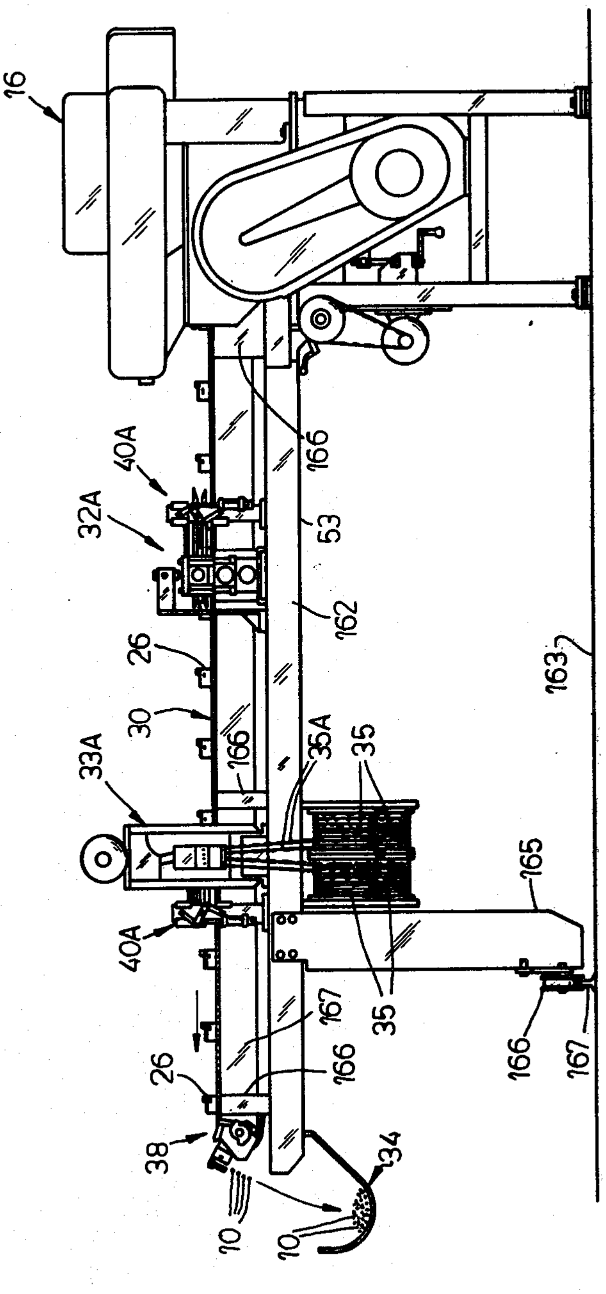
FIG. 2 is a side elevational view of the apparatus shown in FIG. 1.

FIG. 1 is a top plan view of apparatus in accordance with the invention for high-speed production of sets of accurately and identically sized insulated wire leads 10 having wire terminals 11 at both ends thereof. The apparatus generally comprises: a wire dispensing mechanism 12; a wire feed mechanism 16 having feed clamps 17 and 18; a wire straightening and arranging mechanism 20; a wire severing or cut-off mechanism 22; a conveyor 30 having a plurality of spaced apart pairs of wire conveying clamps 25 and 26; conveyor clamp actuator mechanisms 36 and 38 to cause closure and opening of the conveyor clamps 25 and 26; processing mechanisms including two wire cutter and stripping mechanisms 32 and 32A and two electrical terminal attachment mechanisms 33 and 33A; a plurality of terminal dispensing reels 35; a plurality of wire gathering mechanisms 40 and 40A, one for each processing mechanism; and a collecting station 34.

The wire dispensing mechanism 12, includes a frame 13 having a plurality of (four) wire reels 14A, 14B, 14C, 14D for supplying a plurality of separate strands 15A, 15B, 15C, 15D of insulated wire. The feed mechanism 16 includes a pair of counter-reciprocating wire feed clamps 17, 18 for simultaneously drawing the strands of insulated wire from the wire reels. The mechanism 20 simultaneously straightens and arranges the four strands drawn therethrough in parallel spaced apart relationship in a common generally horizontal plane. The severing or cut-off mechanism 22 simultaneously severs a set 23 of four wire segments 23A, 23B, 23C, 23D of predetermined length from the strands while the set 23 is still held by the wire feed clamps 17 and 18. The releasable conveyor clamps 25 and 26 grip and receive the set 23 of wire segments from the feed clamps 17 and 18 and convey the set of wire segments for further processing. The conveyor 30 advances the conveyor clamps 25 and 26 and the set 23 of wire segments therein through the processing mechanisms 32, 32A, 33, 33A for finishing and to the collecting station 34 where the finished leads are deposited. The conveyor clamp actuator mechanisms 36 and 38 near opposite ends of the conveyor 30 cause the conveyor clamps 25 and 26 to initially close and receive a set 23 of wire segments from the feed clamps 17 and 18 for conveyance and subsequently cause the conveyor clamps to release the finished leads 10 for deposit at the collecting station 34. The wire cutter and stripper mechanisms 32 and 32A, one on each side of the conveyor 30, accurately trim both ends of the wire segments in a set 23 simultaneously and strip insulation therefrom simultaneously. The terminal attachment mechanisms 33 and 33A, one on each side of the conveyor 30, simultaneously attach terminals 11 from the terminal dispensing reels 35 to both ends of the wire segments in the sets 23. The wire gathering mechanisms 40 and 40A for the processing mechanism 32, 32A and 33, 33A accurately guide and position the ends of the sets 23 of wire segments therein and hold the sets against displacement during processing.

Figure 3A:
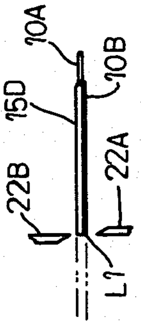
FIGS. 3A, 3B, 3C are enlarged side views showing the strand of wire at various processing stages in production of a finished wire lead.
Figure 3B:
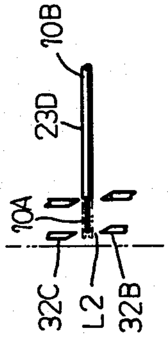
Figure 3C:
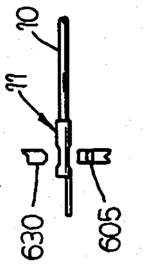
Figure 32A:
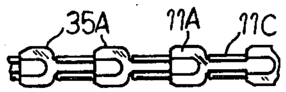
FIG. 32A is a top plan view of a portion of a terminal strip for use in the terminal attachment mechanism.
Figure 32:
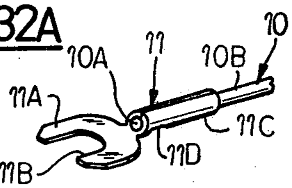
FIG. 32 is an enlarged perspective view of one end of a finished wire lead with a terminal attached thereto.
Figure 31:
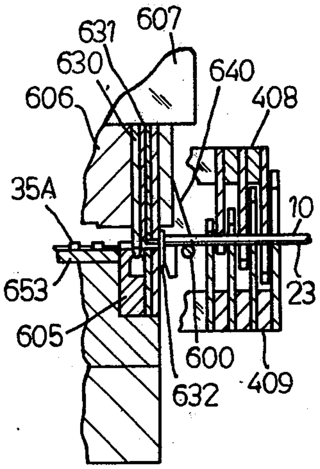
FIG. 31 is a view of a portion of the mechanism shown in FIG. 30 but showing that portion in another operating position.

As FIGS. 3A, 3B and 3C show, each strand 15A, 15B, 15C, 15D of insulated wire comprises a conductor wire 10A, of about 27 gauge, for example, covered by insulation 10B. Each strand is initially severed by the blades 22A and 22B of the cut-off mechanism 22 along a line L1 (see FIG. 3A) while the strand is still gripped by the feed clamps 17, 18 to provide a segment 23A, 23B, 23C, 23D of predetermined length. Each wire segment 23A, 23B, 23C, 23D while held by the conveyor clamps 25, 26 is then subsequently more accurately trim cut by the blades 32B and 32C of the wire cutter and stripper mechanisms 32 and 32A along a line L2 (see FIG. 3B) and then stripped (see FIG. 3B) to provide a trimmed and stripped segment 23A, 23B, 23C, 23D which receives a wire terminal 11 at each end thereof (see FIGS. 3C and 32) in the terminal attachment mechanisms 33 and 33A. As FIG. 32 shows, each terminal 11 comprises a tang 11A having a hole or slot 11B therein and a ferrule 11C which, when fully attached, surrounds and engages a portion of the insulation 10B, as well as the stripped or bare end of conductor wire 10A. Ferrule 11C has a dimple 11D formed therein to facilitate contact with the bare end of wire 10A. A finished lead 10 has terminals such as 11 at each end thereof. Trim cutting along the line L2 at each end of a wire segment 23 and attachment of the terminals 11 while the segments are securely held by the conveyor clamps 25, 26 and the associated wire gathering mechanisms 40, results in a high degree of uniformity of length between the wire segments 23A, 23B, 23C, 23D in a set 23, which uniformity is on the order of about 1/64 of an inch, and provides for an accuracy of ±0.005 of an inch of each segment length which is required as regards placement of the wire end in its associated terminal. Such uniformity and accuracy in segment length and size of stripping enables attachment of the terminals 11 at an extremely high rate of speed without wastage, to thereby enable the apparatus to produce leads 10 at the rate of about 10,000 to 11,000 per hour.

Figure 33:
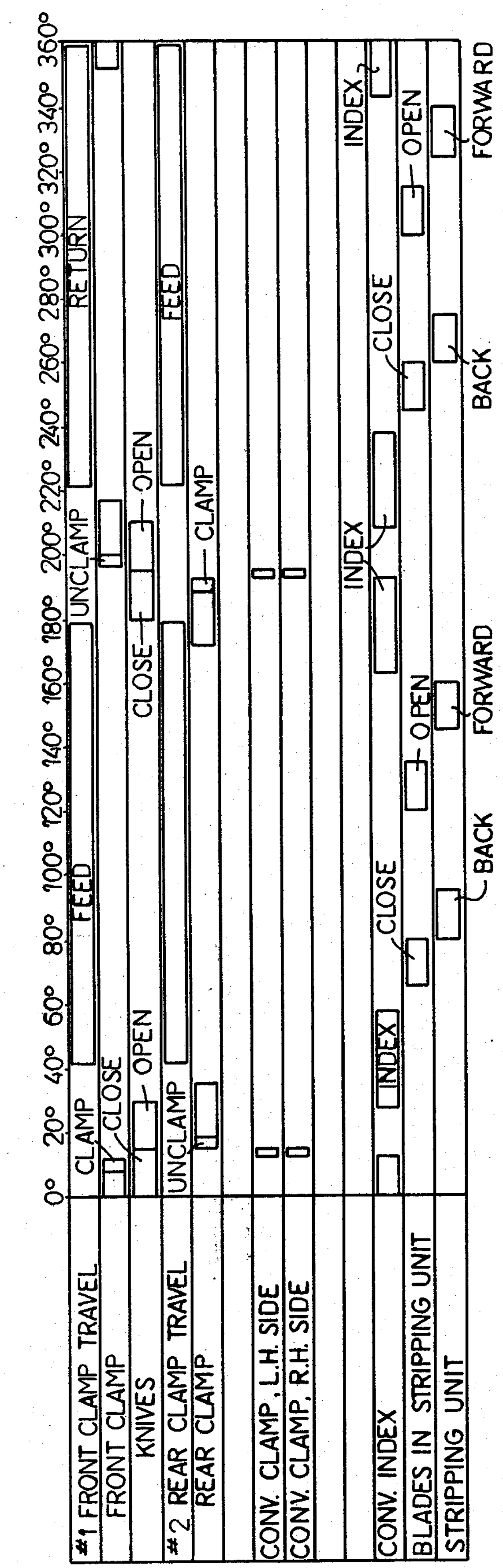
FIG. 33 is a chart showing the operating sequence of mechanisms comprising the apparatus of FIG. 1 during one cycle of operation.

It is to be understood that the aforedescribed apparatus includes control means whereby the operation of the various mechanisms and components in the apparatus operate in coordination and synchronism with each other so that the several processing steps are carried out in the proper timed repetitive sequence, as shown in the chart in FIG. 33 which shows the operation or movement of the various mechanisms during one cycle of operation wherein one set 23 of four wire segments is simultaneously provided, conveyed, processed, and deposited at the collecting station 34 as four finished leads 10.

The various mechanisms comprised in the apparatus will now be individually described in more detail, as regards construction and mode of operation.

Wire Dispensing Mechanism

As FIG. 1 shows, the wire dispensing mechanism 12 comprises a frame 13 having a plurality of wire reels 14A, 14B, 14C, 14D rotatably mounted thereon. Reels 14A and 14D are mounted above and rotate in the same plane as the reels 14C and reel 14B, respectively. The reels 14A and 14D are laterally spaced apart from each other and the reels 14B and 14C are also laterally spaced apart from each other. The four reels 14A, B,C,D, are free wheeling and intermittently supply continuous insulated wire strands 15A,B,C,D which, as hereinafter explained in detail, are straightened and arranged in desired order and periodically cut to provide successive sets 23 of four wire segments 23A,B,C,D of predetermined length, which sets 23 are simultaneously processed, as hereinafter explained, to provide four identically sized wire leads 10 per set which have terminals 11 at each end thereof. The four wire strands 15A,B,C,D are simultaneously drawn in intermittent steps or stages from the reels 14A,B,C,D by the wire feed mechanism 16 hereinafter described in detail. Other arrangements of the four reels on the frame 13 are possible.

Wire Straightening and Arranging Mechanism

As FIGS. 1 and 4–7 show, the four strands 15A, 15B, 15C, 15D are simultaneously drawn in successive steps or stages by wire feed mechanism 16 from the wire dispensing mechanism 12 through the wire straightening and arranging mechanism 20 which performs three functions, namely: straightening the strands by removing any kinks or bends from each strand of wire; arranging the four strands of wire in horizontally spaced apart relationship (on, for example, 0.300 of an inch centers) preferably in a common generally horizontal plane for subsequent severance and conveyance; and preventing the strands from becoming slack after they have been drawn from the free-wheeling reels 14A, 14B, 14C, 14D into the wire feed mechanism 16.

Mechanism 20 comprises two main subcomponents, namely, a roller assembly 50 and a stop assembly 51 which are both rigidly mounted on the framework 52 of the wire feed mechanism 16 by suitable support means 53, although other mounting arrangements could be employed. Roller assembly 50 comprises a generally flat horizontally disposed roller support plate 55 on which four sets 56, 57, 58, and 59 of rollers 60 are mounted, as hereinafter explained. All rollers 60 are identical in construction and each takes the form of a cylinder having a pair of axially spaced apart circumferential wire-receiving and guiding grooves 61 thereon. Each roller 60 has a pin-receiving hole 62 therethrough for receiving an axle pin 63 on which the roller is freely rotatable but secured against axial displacement as by a snap-ring 64. In the following further description, the terms "left" and "right" are used relative to FIGS. 1, 5, and 6 unless otherwise noted.

The left end of roller support plate 55 is provided with a first wire spacer plate 68, secured by screws 67, which has four rectangularly-arranged wire guide holes 69 therethrough for initially arranging the four wire strands 15A, 15B, 15C, 15D in rectangular orientation. The two strands 15B and 15A, with the former above the latter in a vertical plane, pass between the first set of rollers 56. The two strands 15D and 15C, with the former above the latter in a vertical plane, pass between the second set of rollers 57. The four strands 15A, 15B, 15C, 15D pass through a second wire spacer plate 70 which is secured to the top surface of roller support plate 55 by screws 71 and which has four spaced apart horizontally disposed wire-receiving grooves 72 in its upper surface. The two strands 15A and 15B, both now in the same horizontal plane, pass between the third set of rollers 58. The two strands 15C and 15D, both now in the same horizontal plane, pass between the fourth set of rollers 59. From thence, the four strands pass through the stop assembly 51 hereinafter described.

The first and second roller sets 56 and 57, respectively, are substantially identical in construction, and, therefore, only the former is hereinafter described in detail. Roller set 56 comprises three rollers 60, which engage one side of each of the two strands 15A and 15B associated therewith, whose axle pins 63 are rigidly secured to roller support plate 55 and spaced apart from each other in the longitudinal direction of the strands. Roller set 56 also comprises three rollers 60, which engage the other side of each of the two strands 15A and 15B, whose axle pins 63 are rigidly secured to an adjustable roller support plate 75 and spaced apart from each other in the longitudinal direction of the strands. In roller set 56, the three rollers 60 on support plate 55 are longitudinally offset relative to the three associated rollers 60 on adjustable roller support plate 75. The support plate 75 is provided with a pair of rigidly attached spaced apart guide pins 76 which slideably engage a pair of spaced apart guide pin holes 78 extending inwardly of an edge 76 of support plate 55. Support plate 75 is also provided with a hole 79 for accommodating the unthreaded shank portion of an adjustment and mounting screw 80 which extends therethrough and screws into a threaded hole 82 extending inwardly of the edge 76 of support plate 55. A compression-type biasing spring 83 surrounds screw 80 and is disposed between edge 76 of support plate 55 and the facing edge 84 of adjustable support plate 75. Thus, the support plate 75 and the three rollers 60 thereon are relatively movable to a limited degree or can float relative to the other three rollers 60 in set 56 to accommodate kinks or bends in the oncoming strands, while at the same time acting to effect removal of such kinks or bends in the horizontal direction.

The third and fourth roller sets 58 and 59, respectively, are substantially identical in construction, and, therefore, only the former is hereinafter described in detail. Roller set 58 comprises three rollers 60, which engage the underside of each of the two strands 15A and 15B associated therewith, whose axle pins 63 are rigidly secured to roller support plate 55 and spaced apart from each other in the longitudinal direction of the strands. Roller set 58 also comprises three rollers 60, which engage the top side of each of the two strands 15A and 15B, whose axle pins 63 are rigidly secured to an adjustable roller support plate 85 and spaced apart from each other in the longitudinal direction of the strands. In roller set 58, the three rollers 60 on support plate 55 are longitudinally offset relative to the three associated rollers 60 on adjustable roller support plate 85. The support plate 85 is provided with a pair of rigidly attached spaced apart guide pins 76 which slideably engage a pair of spaced apart guide pin holes 78 extending inwardly of the top surface of support plate 55. Support plate 55 is also provided with a hole 79 for accommodating the unthreaded shank portion of an adjustment and mounting screw 80 which extends therethrough and screws into a threaded hole 82 extending inwardly of the upper surface of support plate 55. A compression-type biasing spring 83 surrounds screw 80 and is disposed between the bottom of a recess 86 in the upper surface of support plate 55 and the facing undersurface 87 of adjustable support plate 85. Thus, the support plate 85 and the three rollers 60 thereon are relatively movable to a limited degree or can float relative to the other three rollers 60 in set 59 to accommodate kinks or bends in the oncoming strands, while at the same time acting to effect removal of such kinks or bends in the vertical direction.

Thus, the roller sets 56 and 57 are disposed for rotation in a horizontal plane and the roller sets 58 and 59 are disposed for rotation in a vertical plane. The adjustment screws 80 enable changes in spacing between oppositely disposed rollers in a set to take into account differences in wire diameter.

Figures 5, 6, 6A, 7:
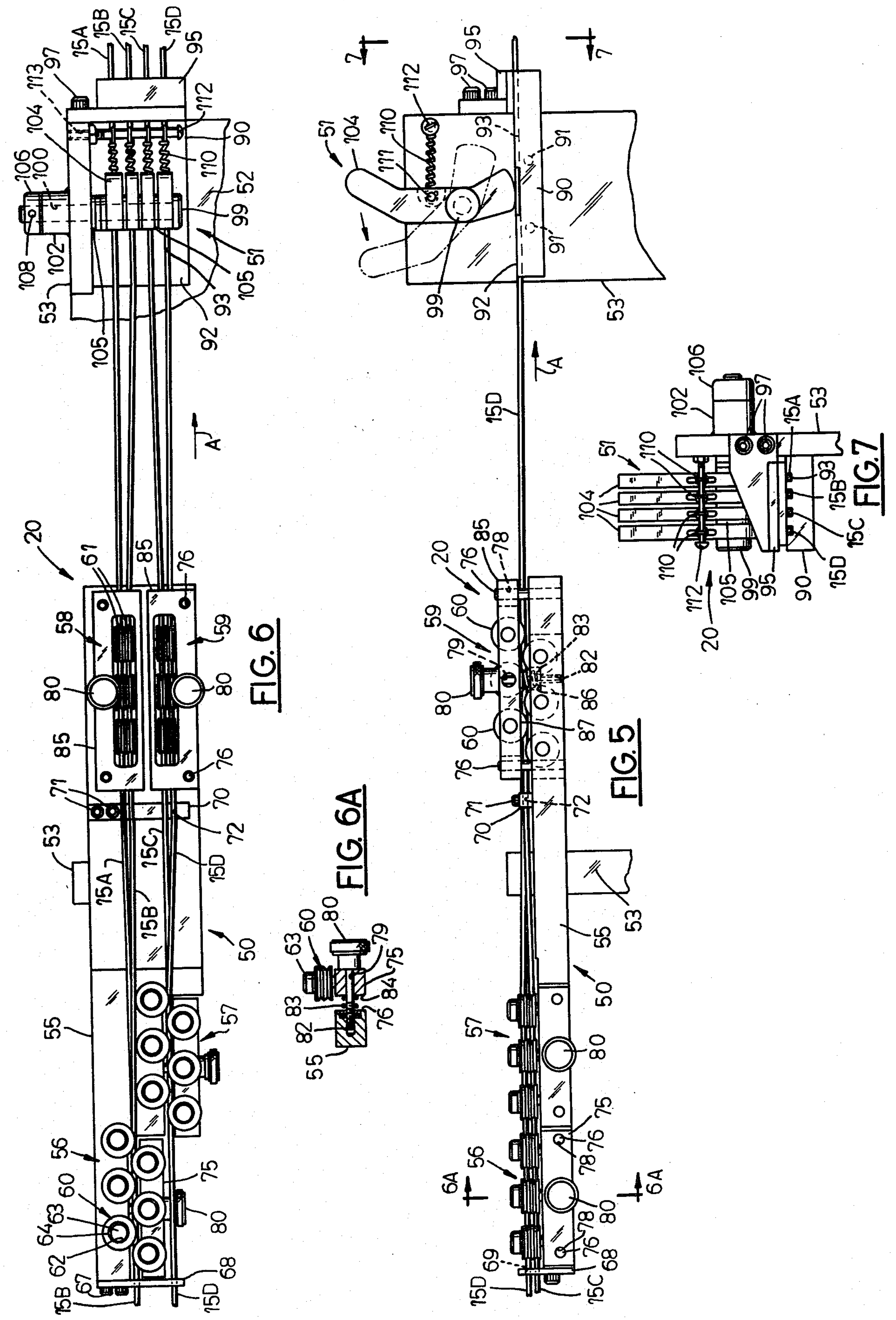
FIG. 5 is an enlarged side elevational view of a wire straightening and arranging mechanism taken on line 5—5 of FIG. 1.
FIG. 6 is a top plan view of the mechanism shown in FIG. 5.
FIG. 6A is a view partly in cross section taken on line 6A—6A of FIG. 5.
FIG. 7 is an end view of the mechanism taken on line 7—7 of FIG. 5.

As FIGS. 5, 6, and 7 show, stop assembly 51 comprises a horizontally disposed grooved plate 90 which is rigidly secured to upstanding frame 53 by bolts 91 and which is provided on its upper surface 92 with four parallel spaced apart wire-receiving grooves 93 for the strands 15A, 15B, 15C, 15D. A wire-entrapment plate 95 overlies the right end of plate 90 to maintain the strands in the grooves 93 and plate 95 is rigidly secured to the right edge of support 53 by a pair of bolts 97. That portion of frame 53 located above grooved plate 90 supports an axle 99 which takes the form of a bolt which extends through a hole 100 in frame 53 and a hub 102 secured on the rear of frame 53. Axle 99 pivotally supports a plurality of (four) independently pivotable wire-engaging stop members 104 which are separated from each other and from frame 53 for appropriate distances by washers 105 so that each stop member 104 is disposed directly above its associated wire strand. Axle 99 is secured against axial displacement by a collar 106 which bears against hub 102 and has a set screw 108 therein which tightens against the axle. Each stop member 104 is biased clockwise (with respect to FIG. 5) by a helical compression spring 110 which has one end connected to a pin 111 on member 104 above axle 99 and has its other end anchored to an anchor bolt 112 which is threaded into a threaded hole 113 in frame 53 and extends parallel to axle 99. Each stop member 104 has a lower curved surface 115 which is biased into frictional engagement with the upper surface of a wire strand located in a groove 93 in plate 90. When a wire strand is moving in the direction of the arrow A, shown in FIG. 5, the stop member 104 tends to be moved counterclockwise (with respect to FIG. 5) against the bias of spring 110, and such movement occurs as the strands are drawn from the wire supply reels. However, since the drawing motion of the feed mechanism 16 is intermittent, there are periodic intervals when the wire strands are not moving in the direction of arrow A. When this occurs, biasing spring 110 tends to pivot the stop member 104 clockwise (with respect to FIG. 5) into tighter engagement with the wire strand thereby forcing the strand more tightly in its groove 93 in plate 90. This prevents any slackness of the wire strand in the region between wire stop assembly 51 and whichever of the feed clamps 17 or 18 of wire feed mechanism 16 is closest to the stop assembly 51. Such slackness might otherwise occur due to the momentum of the free-wheeling wire supply reels 14A, 14B, 14C, 14D.

Wire Feed Mechanism

As FIGS. 1, 2, 4, 8, 9, and 10 show, wire feed mechanism 16 comprises a supporting framework 52 on which a pair of spaced apart parallel horizontally disposed guide rails 120 and 121 are mounted. The guide rails 120 and 121, which are supported on a bar 120A, slideably support feed clamp heads 122 and 123, respectively, which include feed clamps 17 and 18, respectively, which are counter-reciprocably movable relative to each other along the guide rails. The feed clamp heads 122 and 123 are driven by a cable 125 which is mounted for reciprocating movement around a pulley 126 which is provided on one end of framework 52. Cable 125 has oppositely disposed parallel portions 125A and 125B which are driven in opposite directions relative to each other by means of an electric motor 130 which actuates a drive mechanism 131 to which the cable 125 is attached. As will hereinafter appear, the electric motor 130 also provides operating power for the conveyor mechanism 30 hereinafter described. The wire feed mechanism 16 is generally similar in construction and mode of operation of that disclosed in U.S. Pat. No. 3,918,330, but differs therefrom as regards the construction and operation of the feed clamp heads 122 and 123 and the feed clamps 17 and 18, respectively, therein.

The feed clamp heads 122 and 123 are identical to each other in construction and mode of operation. Therefore, only feed clamp 123 is hereinafter described in detail. As FIGS. 8, 9, and 10 best show, feed clamp head 123 comprises a body having a slot 130 therein for engagement with the guide rail or slide bar 121, along which the feed clamp head reciprocably moves. The feed clamp head 123 encloses a rectangular drive shaft 131 which is rockabout about its axis by a cam operated drive mechanism (not shown) which is mounted on the wire feed mechanism 16. A rocker arm 132 is secured to rocking drive shaft 131 and is oscillatable therewith between the feed clamp closed position shown in FIG. 8 and the open position in FIG. 9. Feed clamp head 123 further comprises a retractable member 135 which is slideably mounted on the body 136 and is movable between the down and up positions shown in FIGS. 8 and 9, respectively. Movable member 135 supports or carries a first retractable jaw 138 which is resiliently mounted thereon by spring means 139.

Figure 9:
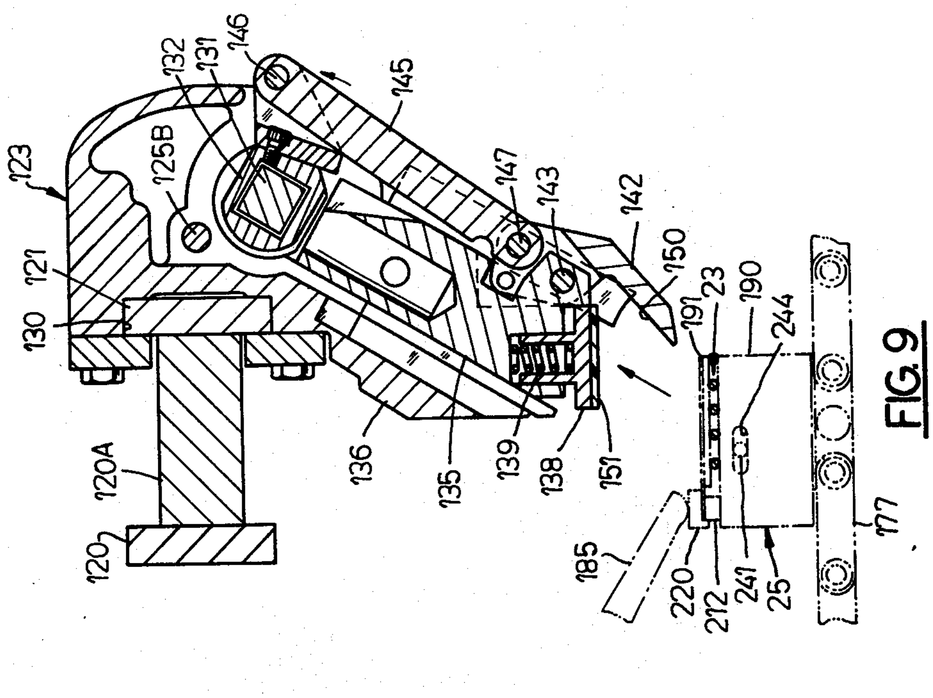
FIG. 9 is a view similar to FIG. 8 but showing the feed clamp in raised and open position.
Figure 8:
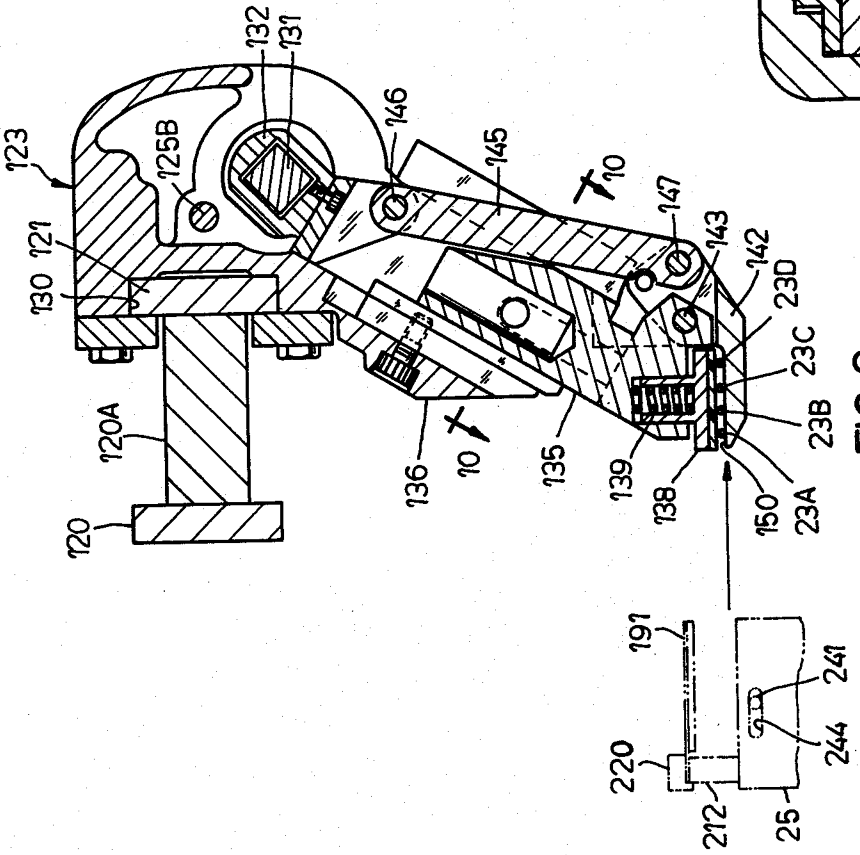
FIG. 8 is an enlarged cross-sectional view of a feed clamp taken on line 8—8 of FIG. 1 and shows the feed clamp in lowered and closed position.
Figure 10:
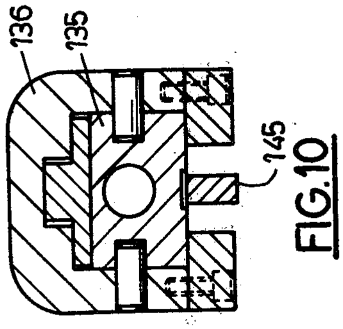
FIG. 10 is a cross-sectional view taken on line 10—10 of FIG. 8.

Feed clamp head 123 further comprises a pivotally movable jaw 142 which is pivotally connected to retractable member 135 by a connecting pivot pin 143. A link 145 has its upper end connected by an upper pivot pin 146 to rocker arm 132 and has its lower end pivotally connected by a lower pivot pin 147 to the pivotally movable jaw 142. The pivotable jaw 142 has a flat gripping surface 150 which confronts a flat gripping surface 151 on the retractable jaw 138, which surface 151 takes the form of a resilient cushion or pad which is secured as by gluing to the retractable jaw 138 to assure that a set 23 of wire segments is securely gripped between the jaws 150 and 138 but is not exposed to crushing or damage therebetween. FIG. 8 shows feed clamp head 123 in a wire gripping position wherein the retractable jaw 138 is fully extended from the body 136 and the pivotable jaw 142 is swung to fully closed position. FIG. 9 shows feed clamp head 123 in fully open position wherein the rocking shaft 131 is rotated approximately 90° counterclockwise and the rocker arm 132 is correspondingly positioned and such movement causes the link 145 to be raised. As the link 145 is raised, it causes pivotable jaw 142 to pivot counterclockwise about the connecting pivot pin 143. When pivotable jaw 142 is fully pivoted, further upward movement of link 145 causes the movable member 135 and the pivotable jaw 138 to be upwardly retracted so that the feed clamp head 123 assumes the open position shown in FIG. 9.

Figure 4:
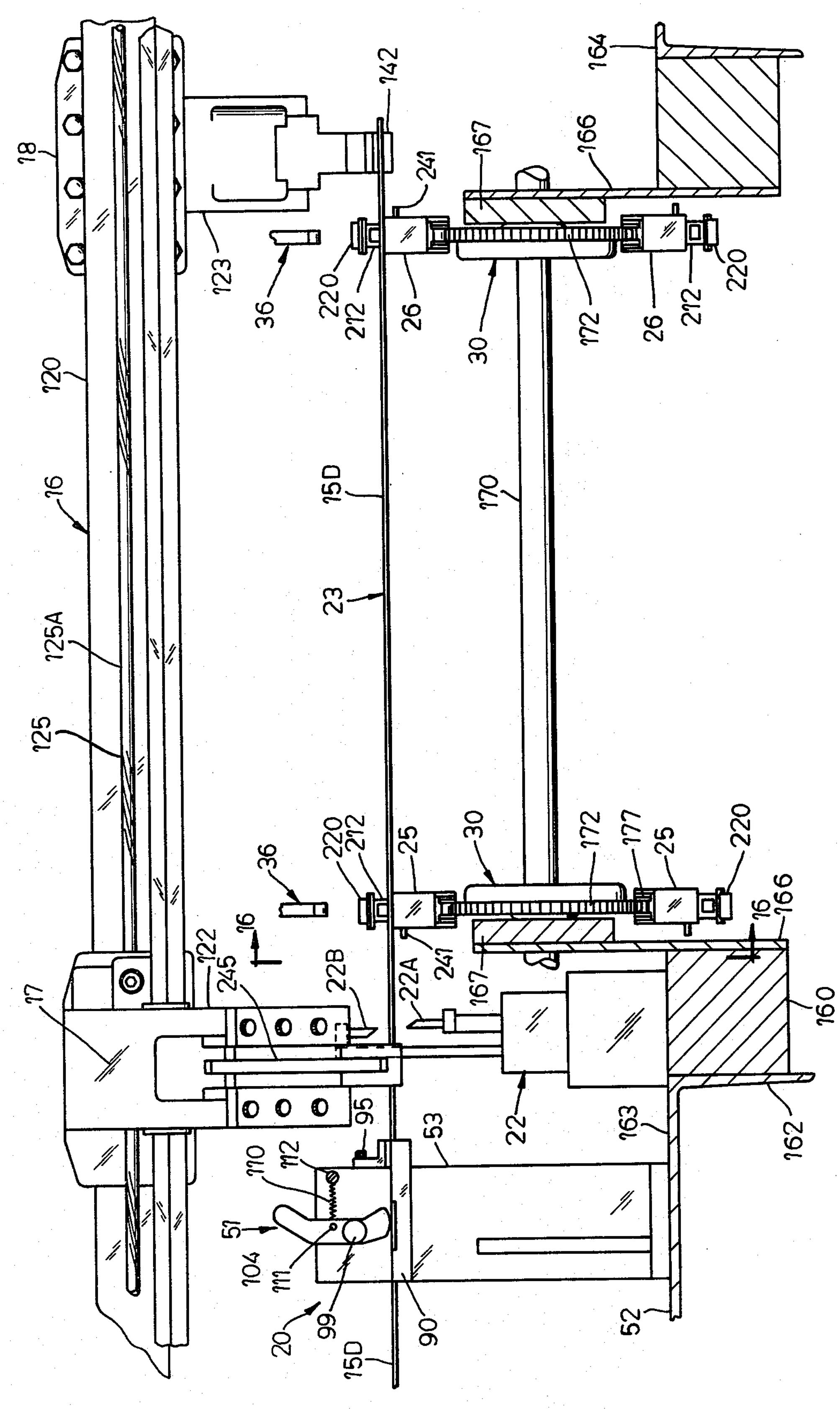
FIG. 4 is a view of the apparatus taken on line 4—4 of FIG. 1.

In operation, the feed clamp head 123 travels leftward during the final stage of a return stroke from the position in which it is shown in FIG. 1 to the position shown in FIG. 4 and with the wire gripping jaws on clamp 17 in an open position. At the same time, the feed clamp head 123 travels rightward during the final stage of a feed stroke from the position in which it is shown in FIG. 1 to the position shown in FIG. 4 and with wire gripping jaws on the clamp 18 in closed position. Upon arrival of the clamps 17 and 18 at the ends of their above-described strokes, they come to a momentary standstill during which the wire gripping jaws of clamp 17 become closed and those of clamp 18 become opened by the feed clamp actuator mechanism (not shown). Also, while the feed clamps 17 and 18 are at a standstill, the cut-off mechanism 22 is actuated with the result that a set 23 of four wire segments 23A, 23B, 23C, 23D which have been drawn rightward in FIG. 1 by a feed stroke of clamp 18 are severed from the strands 15A, 15B, 15C, 15D fed from machine 12.

After the cut-off stroke of the cut-off mechanism 22, the closed clamp 17 is started on a rightward feed stroke (with respect to FIG. 4) and the clamp 18 is simultaneously started on a leftward return stroke (with respect to FIG. 4) by the mechanism 16. Upon arrival of clamp 17 at the end of its rightward feed stroke and the simultaneous arrival of clamp 18 at the end of its leftward return stroke, the clamps come again to a momentary standstill. The mechanism 16 is then immediately operated again to simultaneously open the gripping jaws of clamp 17 and close those of clamp 18; then to cut the next set 23 of four wire segments which have been drawn from dispensing mechanism 12 by the feed stroke of clamp 17, and finally to simultaneously initiate a return stroke of clamp 17 and a feed stroke of clamp 18. Such alternate and repetitive functioning of the feeding clamps 17 and 18 may continue for any desired length of time to successively produce successive sets 23 wire leads of a predetermined length and at a high rate of speed.

The Conveyor Mechanism And The Wire-Conveying Clamp

As FIGS. 1, 2, 4, 16, 17, 18, and 21 show, the apparatus includes a conveyor mechanism 30 having pairs of wire-conveying clamps 25 and 26 thereon for grasping, conveying, and releasing successive sets 23 of wire segments. Conveying mechanism 30 comprises a framework 160 which is connected to framework 52 of feed mechanism 16. The framework 160 includes a side plate 162 which has one end rigidly secured to framework 52 and has its other end supported by a downwardly depending leg (not shown) which is secured to floor 163. The framework 160 also includes another side rail 164 which has one end slideably supported on the framework 52 of feed mechanism 16 and has its other end supported by a downwardly depending leg 165 (see FIG. 2), which leg is provided with a rotatable wheel 166 which engages a guide rail 167 which is rigidly secured to floor 163. Thus, the guide rail 164 may be adjustably moved toward or away from the other side rail 162 to enable the apparatus to be set up initially to accommodate sets 23 of wire segments of various lengths. As FIGS. 1, 2, and 4 best show, the pair of spaced apart side rails 162 and 164 of conveyor mechanism 30 serve as platforms on which the operating mechanisms 32, 32A, 33, 33A, 40, 40A are supported. The side rails 162 and 164 are also provided with rigidly attached upwardly extending brackets 166 on which conveyor side plates 167 are rigidly mounted. The side plates 167 at their ends nearest the feed mechanism 16 rotatably support a rotatable shaft 170 which is driven by suitable motor and drive mechanism (not shown). Shaft 170 is suitably supported for rotation on the side plates 167 by suitable bearings (not shown). Shaft 174 is provided with a pair of spaced apart sprockets 172 which are pinned or keyed to shaft 170 for rotation therewith as shaft 170 is rotated.

The side plates 167 at their ends nearest the collecting station 34 rotatably support a rotatable idler shaft 174 which is suitably supported for rotation thereon by bearings (not shown). Idler shaft 174 is provided with a pair of spaced apart idler sprockets 176 which are pinned or keyed to shaft 174 for rotation therewith.

Each driven sprocket 172 and its associated idler sprocket 176 carries an endless flexible conveyor chain 177 which is fabricated of articulatable links 178 and adjacent links are connected by link pins 179. The upper flight of each chain 177, which moves in the direction of arrow 180 shown in FIGS. 2, 16, 17, 18, and 21, is supported against downward sagging by a chain guide member 182 and is secured along the top edge of the side plate 167. Each chain 177 carries a plurality of wire-conveying clamps 25 or 26 which are connected at spaced apart intervals therealong. As hereinafter explained, each pair of clamps 25 and 26 on the spaced chains 177 are in alignment with each other, as FIG. 1 shows, and serve to grasp a set 23 of wire segments presented by the feed clamps 17 and 18, convey the set for processing and subsequently release the finished set of wire leads into collecting station 34. The clamps 25 and 26 are identical in construction and mode of operation and only clamp 25 is hereinafter described in detail.

Figure 16:
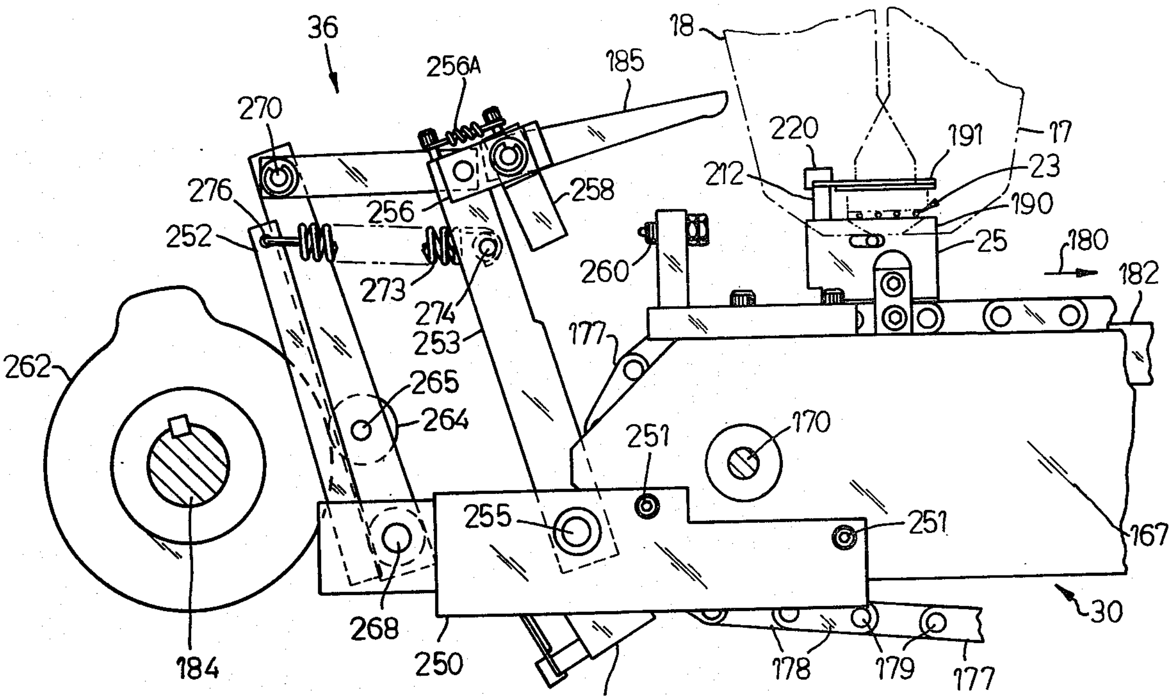
FIG. 16 is a side elevational view taken on line 16—16 of FIG. 4 of a conveyor clamp actuator mechanism operable to close a conveyor clamp and showing the mechanism in raised position.
Figure 17:
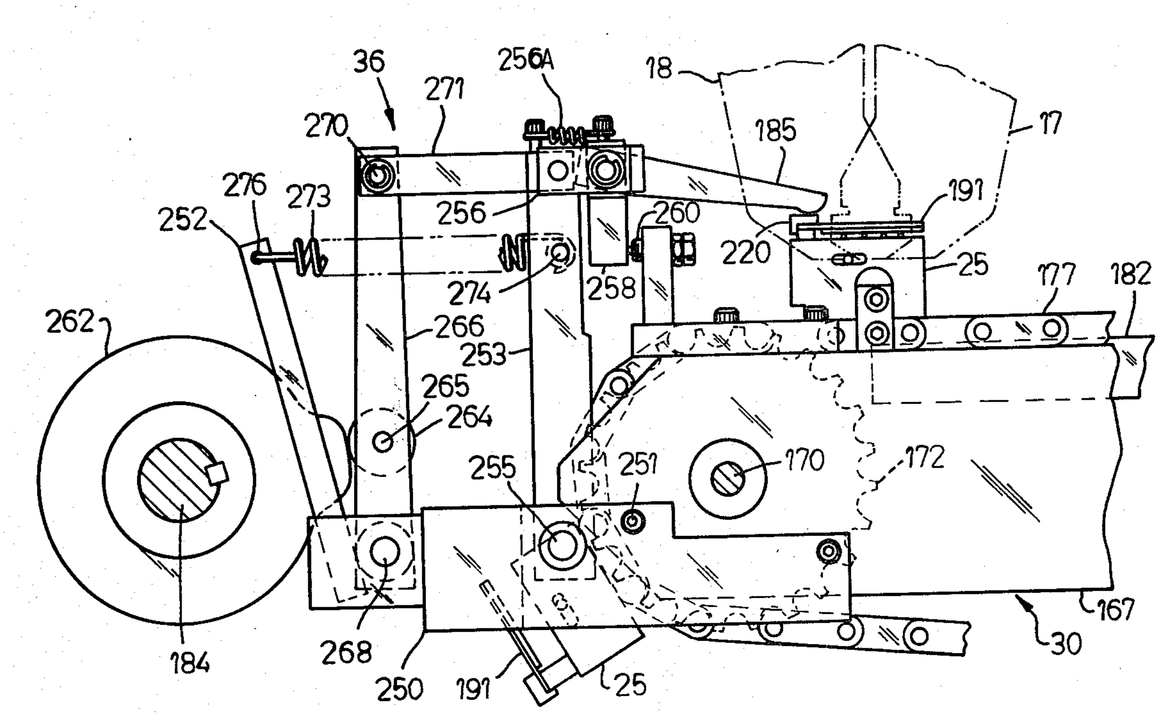
FIG. 17 is a view similar to FIG. 16 but showing the conveyor clamp actuator mechanism in lowered position wherein it closes a conveyor clamp.

As FIGS. 12–15 show, clamp 25 comprises a body 190, a jaw 191 movable between open and closed positions on the body, and a latch mechanism 192 for releasably latching jaw 191 in closed position. As FIGS. 16 and 17 show, jaw 191 is moved from open to closed position by a conveyor clamp actuator mechanism 36 near the in-feed end of the conveyor. As FIGS. 18, 19, 20, and 21 show, jaw 191 is moved from closed to open position by another conveyor clamp actuator mechanism 38 near the discharge end of the conveyor.

More specifically, clamp 25 comprises a body 190 which includes a metal frame 195 having a vertical slot 196 in its rear end wall, a horizontal bore 197 extending through the frame from front to rear, a downwardly depending side wall 198 on one side of the frame, and a side retaining plate 199 secured by a screw 200 on the other side of the frame. Depending side wall 198 and retaining plate 199 have screw-receiving holes 201 and 202, respectively, therethrough for a screw 205 which secures the clamp 25 to the conveyor chain 177. Screw 205 has a spacer 206 thereon which is disposed between the link plates 178A and 178B forming the associated chain link 178. Depending side wall 198 also has clearance holes 210 for the link pins 179 in the associated chain link 178.

Vertical slot 196 in frame 195 accommodates a bar 212 which is slideably mounted therein and held in place by backing plate 213 which is secured to frame 195 by four screws 214. A flat horizontal upper clamp plate or jaw 191, having a resilient strip of material 215 glued to the inner surface thereof similar to the strip 217 glued to the top surface of frame 195, is secured to the upper end of bar 212 by screws 216 which extends through holes 218 in a block 220. Bar 212 has a rectangular latch-receiving hole 222 extending therethrough from front to rear near the upper end thereof. Bar 212 also has a spring-receiving hole 224 extending thereinto from the bottom end thereof. Hole 224 accommodates a helical compression-type biasing spring 226 which urges the bar 212 upward toward jaw-open position and which has its lower end anchored by an upwardly extending retaining screw 227 in the backing plate 213. Bar 212 has a stop projection 230 on the front side thereof and near its lower end for engagement with the inner wall 231 of frame 195 to limit upward travel of the bar.

Horizontal bore 197 in frame 195 accommodates a latch member 233 which is slideably mounted therein and held in place by a retaining plate 234 which is secured to frame 195 by two screws 235. The rear end of latch member 233 has a sloped latching surface 236. Latch member 233 has a spring-receiving hole 237 therein extending rearwardly from the front end thereof. Hole 237 accommodates a helical compression-type latch spring 238 which urges the latch member 233 toward the bar 212 and which has its end anchored by a retaining screw 240 in retaining plate 234. Latch member 233 carries an actuating lever 241 which extends outwardly from the side thereof through a slot 244 in frame 195.

Figure 11:
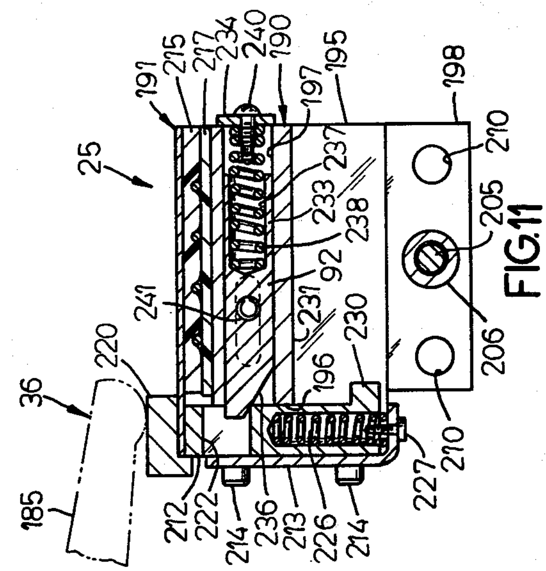
FIG. 11 is an enlarged side elevational view, partly in cross section, of a conveyor clamp taken on line 11—11 in FIG. 1 and shows the conveyor clamp in closed position.
Figure 12:
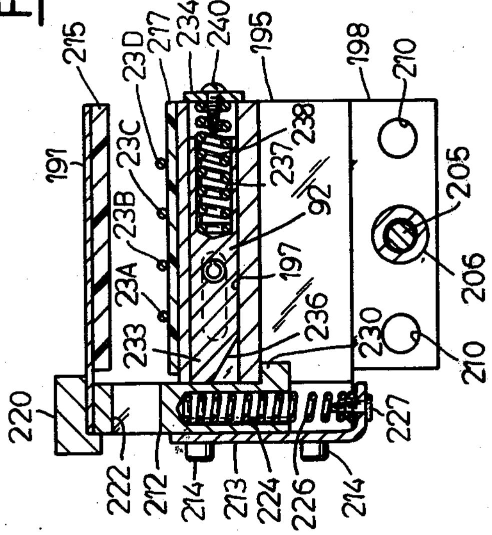
FIG. 12 is a view similar to FIG. 11 but showing the conveyor clamp in open position.
Figure 15:
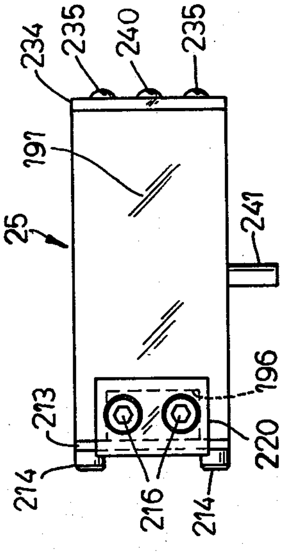
FIG. 15 is a top plan view of the clamp shown in FIG. 13.
Figure 13:
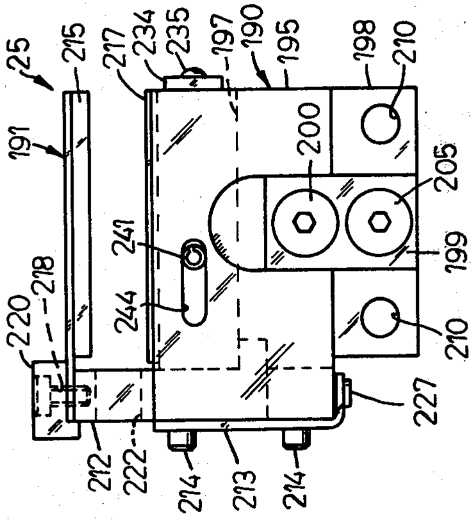
FIG. 13 is a side elevational view similar to FIG. 12.
Figure 13A:
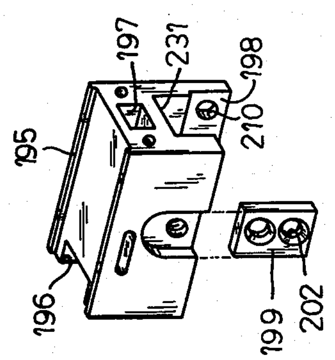
FIG. 13A is a perspective view of certain components in the conveyor clamp shown in FIG. 13.
Figure 14:
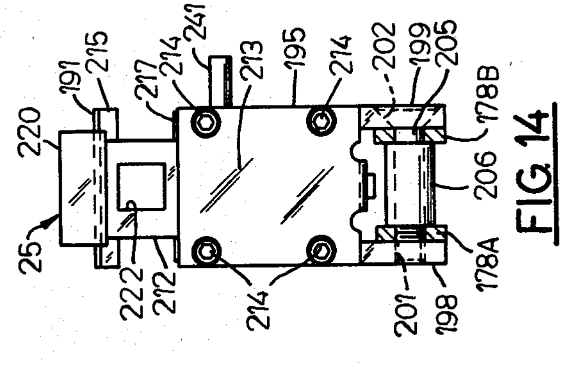
FIG. 14 is an end view of the clamp shown in FIG. 13.

In operation, as FIG. 16 shows, clamp 25 with its jaw 191 open, is conveyed in stages upside down along the underside of conveyor 30 and then around the driven sprocket 172. As this occurs, a set 23 of wire segments are being held stationary by the feed clamps 17 and 18 in flat planar arrangement. When conveyor clamp 25 advances to the position shown in FIG. 16, the set 23 of wire segments is disposed between the open jaw 191 and body 195. At this point, conveyor clamp actuator mechanism 36 is operated by a timing cam 262 on actuator shaft 184 and the clamp-closing finger 185 moves rightward and downward (with respect to FIGS. 16 and 17), thereby engaging block 220 on clamp 25 and forcing jaw 191 downward to closed position. As FIGS. 11 and 12 make clear, bar 212 to which block 220 is attached, is moved downwardly against the bias of spring 226 and eventually, latch member 233 is moved leftward (with respect to FIGS. 11 and 12) under the force of its latch spring 230 into latch-receiving hole 224 whereupon jaw 191 is latched or locked in closed position, as shown in FIG. 11. When the set 23 of wire segments is securely gripped in the set of conveyor clamps 25 and 26, the feed clamps 17 and 18 are caused by the operating mechanism to release their grip on the set and the conveyor 30 advances the conveyor clamps 25 and 26 with a set 23 of wire segments gripped therein.

As FIGS. 16 and 17 show, conveyor clamp actuator mechanism 36 comprises a horizontally extending frame 250 which is secured to the side plate 167 of conveyor mechanism 30 by a pair of screws 251 and upwardly extending spring anchor member 252 is rigidly secured to frame 250 as by welding. A first lever 253 is pivotally attached to frame 250 by a pivot pin 255 and is provided at its upper end with finger 185, hereinbefore referred to, which is pivotally attached to a bracket 256 which, in turn, is rigidly secured to lever 253. A travel stop block 258 is rigidly secured to finger 185 to effect clockwise pivoting (with respect to FIGS. 16 and 17) of finger 185 so that the latter can closingly engage clamp 25 and to limit forward travel of the lever 253 by engagement with the stop member 260 which is rigidly secured to side plate 167 of conveyor machine 30. Lever 185, which with block 258 connected thereto provides an L-shaped assembly, is biased counterclockwise relative to lever 253 (with respect to FIG. 16) by a tension spring 256A and can move downward (clockwise) when block 258 engages stop 260. Lever 253 is movable rightward (with respect to FIGS. 16 and 17) from the position shown in FIG. 16 to that shown in FIG. 17 by the cam 262 which engages a cam roller or cam follower 264. Cam roller 264 is rotatably mounted by a pin 265 on a second lever 266 which is pivotally attached to frame 250 by a pivot pin 268. The top end of lever 266 is pivotally connected by a pin 270 to a link or bar 271 which is pivotally connected to the top end of first lever 256. A tension-type return spring 273 is connected between a pin 274 on first lever 253 and a hole 276 on spring anchor member 252 and causes rearward or return movement of finger 185.

Figure 19:
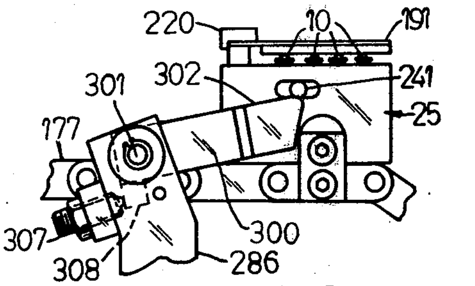
FIGS. 19, 20 and 21 are views of the mechanism shown in FIG. 18 at various stages of operation.
Figure 18:
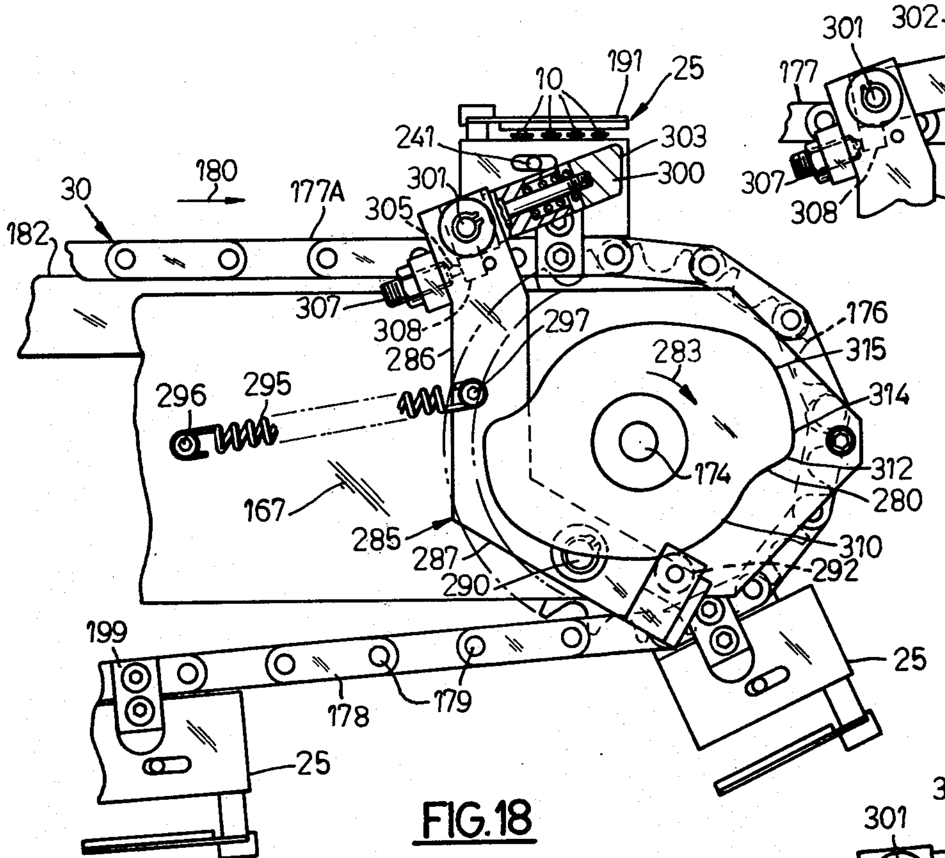
FIG. 18 is an enlarged side elevational view taken on line 18—18 of FIG. 1 of a conveyor clamp actuator mechanism operable to open a conveyor clamp.

When a pair of conveyor clamps 25 and 26 have conveyed a set 23 of wire segments through all processing mechanisms, as hereinafter described in detail, and the finished wire leads are ready to be released from the conveyor clamps, the clamps are opened by the conveyor clamp actuator mechanism 38 near the discharge end of the conveyor mechanism 30. As FIGS. 2 and 18 through 21 show, actuator mechanism 38 comprises a cam 280 which is mounted on and rotatable with idler shaft 174 of conveyor mechanism 30, as by means of a set screw 281. Cam 280 rotates in the direction of arrow 283 shown in FIGS. 18 and 21. Cam 280 operates a release lever 285 which is generally L-shaped and has upper and lower legs 286 and 287, respectively. Lever 285 is pivotally mounted on side plate 167 of conveyor mechanism 30 by a pivot pin 290 on lower leg 287. The end of lower leg 287 of lever 285 carries a roller or cam follower 292 which rides against the cam surface of cam 280. A tension-type biasing spring 295 has one end connected to an anchor pin 296 on side plate 167 and has its other end connected to a pin 297 on the upper leg 286 of lever 285. Spring 295 tends to bias lever 285 counterclockwise (with respect to FIGS. 18 and 21) and ensures that roller 292 remain engaged with cam 280. The end of upper leg 286 of lever 285 carries an actuator member 300 which is pivotally connected thereto by a pivot pin 301. Member 300 comprises an upper surface 302 for sliding engagement with the underside of the actuating lever 241 of a conveyor clamp 25 moving therepast and also comprises a sloped end surface abutting engagement with the rear side of the actuating lever 241, as hereinafter explained. As comparison of FIGS. 18 and 19 shows, member 300 is pivotable downwardly to a limited degree, as lever 241 moves along its upper surface 302, against the bias of a spring-biased pin 305 which is slideably secured in a housing 307 which is threadably secured to the upper leg 286 of lever 285. Pin 305 bears against a downwardly extending projection 308 provided on the underside of member 300.

Figure 20:
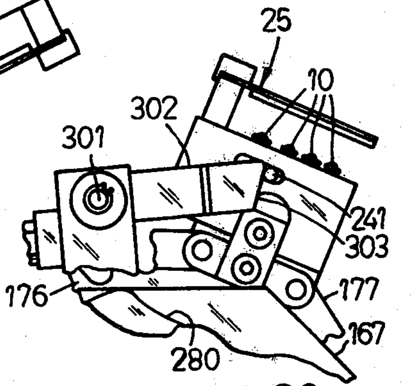
Figure 21:
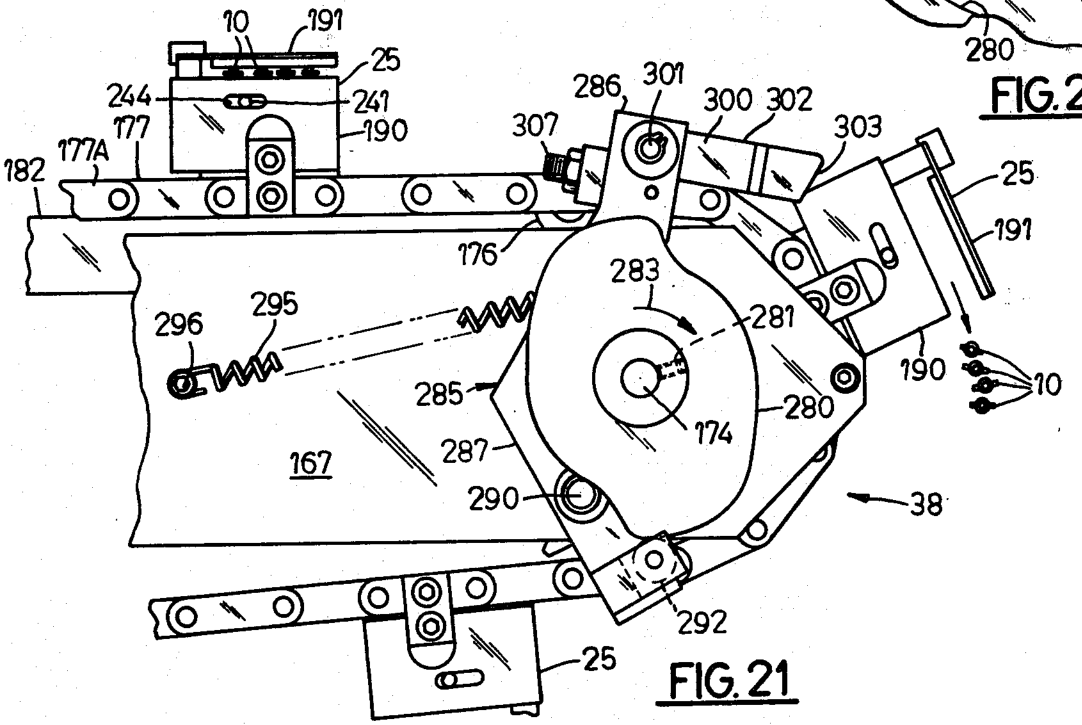

In operation, as shaft 174 rotates, being driven by the action of chain 177 around sprocket 176, the cam 280 rotates therewith. As the cam surface 310 engages roller 292, the spring 295 acts to hold lever 285 in the position shown in FIG. 18. As the upper flight 177A of chain 177 advances, the conveyor clamp 25, with its jaw 191 closed, advances therewith. As FIG. 18 shows, as clamp 25 moves past member 300, the lever 241 engages the upper surface 302 of member 300 and tilts it downwardly to the position shown in FIG. 19. Up to this point, lever 285 has remained stationary. However, when cam surface 312 engages roller 292, it forces lever 285 to pivot clockwise (with respect to the drawings) about pin 290 and the member 300 is moved from the position shown in FIG. 19 to that shown in FIG. 20 and the conveyor clamp 25 has also moved in the same direction and slightly downwardly so that the lever 241 of clamp 25 engages the surface 303 of member 300. As cam 280 continues to act on lever 285, the lever 285 begins to move clockwise at a rate of speed which is greater than the forward rate of speed of clamp 25. As a result, the member 300 forces the lever 241 forward in the slot 244 with the result that the latch member 233 is moved against the action of latch spring 238 into a position wherein the latch member 233 disengages the latch-receiving hole 222 in bar 212. As this disengagement occurs, bar 212 is able to move upwardly under the action of its biasing spring 226 and causes jaw 191 to move to open position. As shown in FIGS. 20 and 21, with jaw 191 open, the finished wire leads 10 fall downwardly under the force of gravity into receptacle 34. As comparison of FIGS. 20 and 21 shows, when cam surface 314 acts upon roller 292, lever 285 has already reached the extreme limit of its clockwise travel and the shape of the cam surface 315 (which is a mirror image of surface 310) permits spring 295 to move lever 285 counterclockwise to its starting position shown in FIG. 18, placing it in readiness for another operation as hereinbefore described. As FIGS. 18 and 21 show, clamp 25 in open condition is conveyed by chain 177 along the underside of conveyor mechanism 30 until it reaches and is acted upon the conveyor actuator mechanism 36 hereinbefore described in connection with FIGS. 16 and 17 which effects reclosure of the conveyor clamp 25 after a set 23 of wire segments has been received between its jaws.

The Wire Gathering Mechanism

Conveyor mechanism 30 and each pair of conveyor clamps 25 and 26 thereon transport a set 23 of wire segments received from the wire feed mechanism 20 in progressive steps or stages along the conveyor and toward, through, and then away from the processing mechanisms, including the two wire cutter and stripping mechanisms 32 and 32A and the two electrical terminal attachment mechanisms 33 and 33A. In each set 23 of wire segments, the wire segments are disposed in spaced apart parallel arrangement in a horizontal plane and the wire segments are tightly held between the pair of conveyor clamps 25 and 26. The ends of the wire segments project beyond the outboard edges or sides of the conveyor clamps 25 and 26 so that the projecting ends can pass through the processing mechanisms which operate thereupon. It is necessary that the projecting ends of the wire segments in each set 23 be accurately positioned relative to each other and relative to the processing mechanism and be held securely against axial displacement when being operated upon by the processing mechanisms, and this is accomplished by the wire gathering mechanisms 40 and 40A which are physically associated with and operate in timed relationship with the appropriate processing mechanism and the conveyor mechanism 30. The two wire gathering mechanisms 40 and the two wire gathering mechanisms 40A shown in FIG. 1 are substantially identical in construction and mode of operation, although the mechanisms 40A are reversed with respect to the mechanism 40. Accordingly, only the wire gathering mechanism 40 associated with the wire cutting and stripping mechanism 32 is hereinafter described in detail.

As FIGS. 22, 23, 24, 25, 26, 27, and 28 best show, the aforesaid wire gathering mechanism 40 is rigidly supported on side rail 162 of conveyor mechanism 30 and comprises a supporting frame 350, including a base plate 351 secured to side rail 162 by mounting screws 352 and an upstanding frame 353 rigidly secured to base plate 351 as by welding and by welded gussets 354. Upstanding frame 353 includes a hole 355 in which a pivot link support pin 357 is mounted and also includes upper and lower elongated guide slots 360 and 361, respectively, for accommodating upper and lower guide rollers 364 and 365, respectively. Pivot link support pin 357 is connected to the center of a pivot link 367 and the ends of the link 367 are connected by pins 380 and 381 to the inner ends of the upper and lower links 384 and 385, respectively. The outer ends of the links 384 and 385 are connected to pins which project from the ends of the upper and lower guide rollers 364 and 365, respectively. One end of pivot link 367 is also connected by pin 381 thereon to a clevis 390 on the end of a piston rod 391 which extends upwardly from one end of a cylinder 392 of a pneumatic ram 393. The lower end of cylinder 392 is connected by a pin 394 to a cylinder support block 395 which is secured to upstanding frame 353 by mounting screws 396. The upper and lower guide rollers 364 and 365, respectively, are connected by screws 400 and 401, respectively, to upper and lower arm support plates 402 and 403, respectively, which are mounted for vertical sliding movement on upstanding frame 353. The plates 402 and 403 provide support for support arms 404 and 405, respectively, which are attached thereto by mounting screws 406, which extend therefrom along and above a side of the conveyor mechanism 30 toward and in front of the wire cutting and stripping mechanism 32. The upper and lower support arms 404 and 405 are provided with upper and lower wire gathering heads 408 and 409, respectively, which are secured at the ends thereof by mounting screws 410. A pair of stationary wire guide rails 412 and 413 which are stationarily mounted on upstanding frame 353 by mounting screws 414 are spaced apart to define a wire guide slot 415 and are disposed in a plane parallel to but between the wire gathering heads 408, 409 and the processing mechanism 40.

Figure 23:
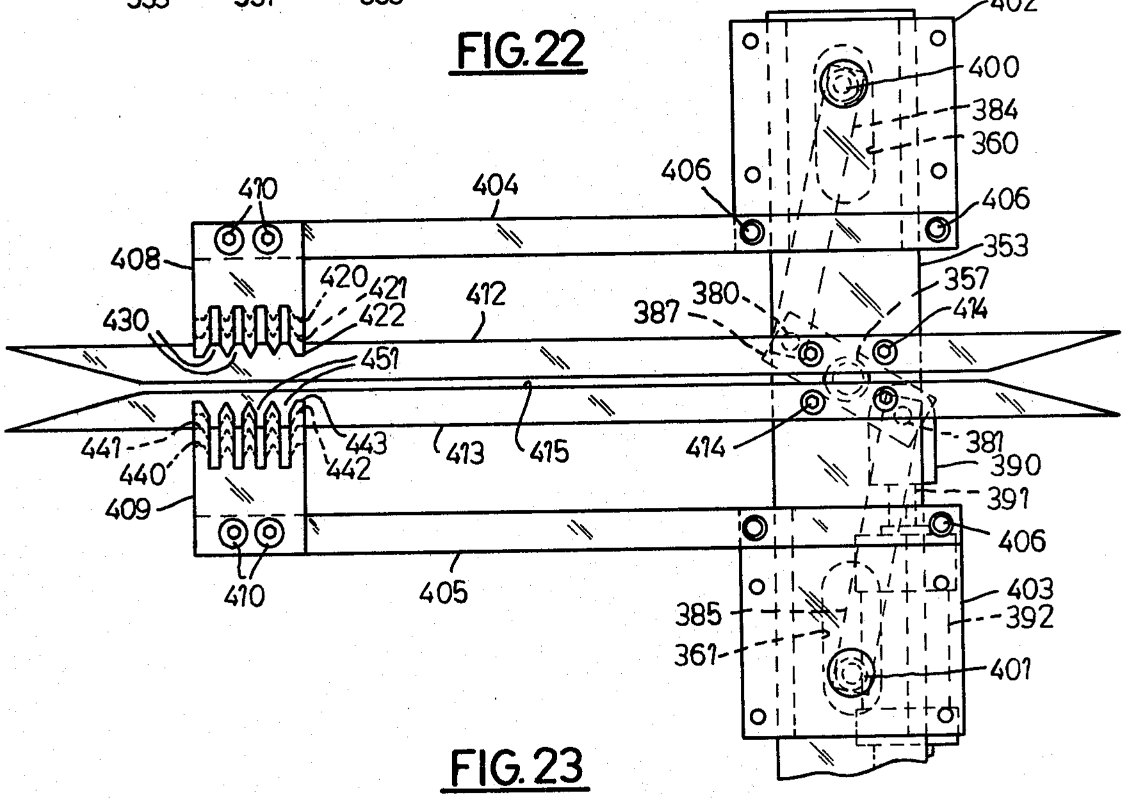
FIG. 23 is a side elevational view of the wire gathering mechanism shown in FIG. 22 but showing that mechanism in open position.
Figure 24:
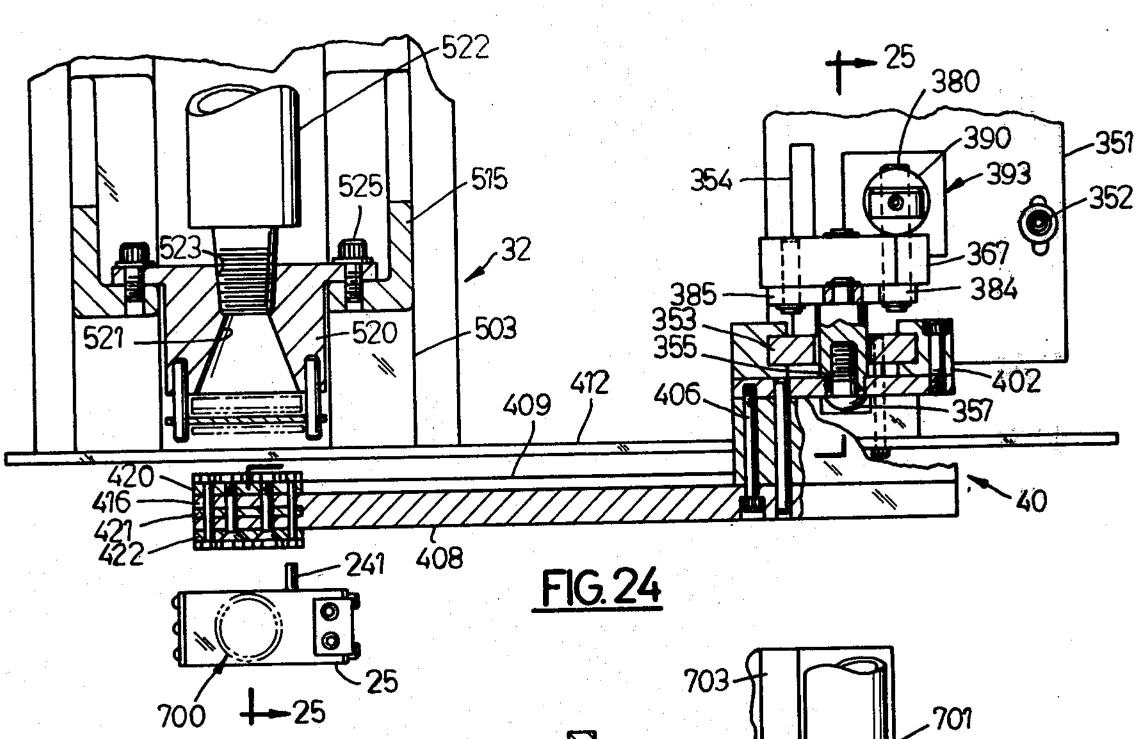
FIG. 24 is a cross-sectional view taken on line 24—24 of FIG. 22.
Figure 25:
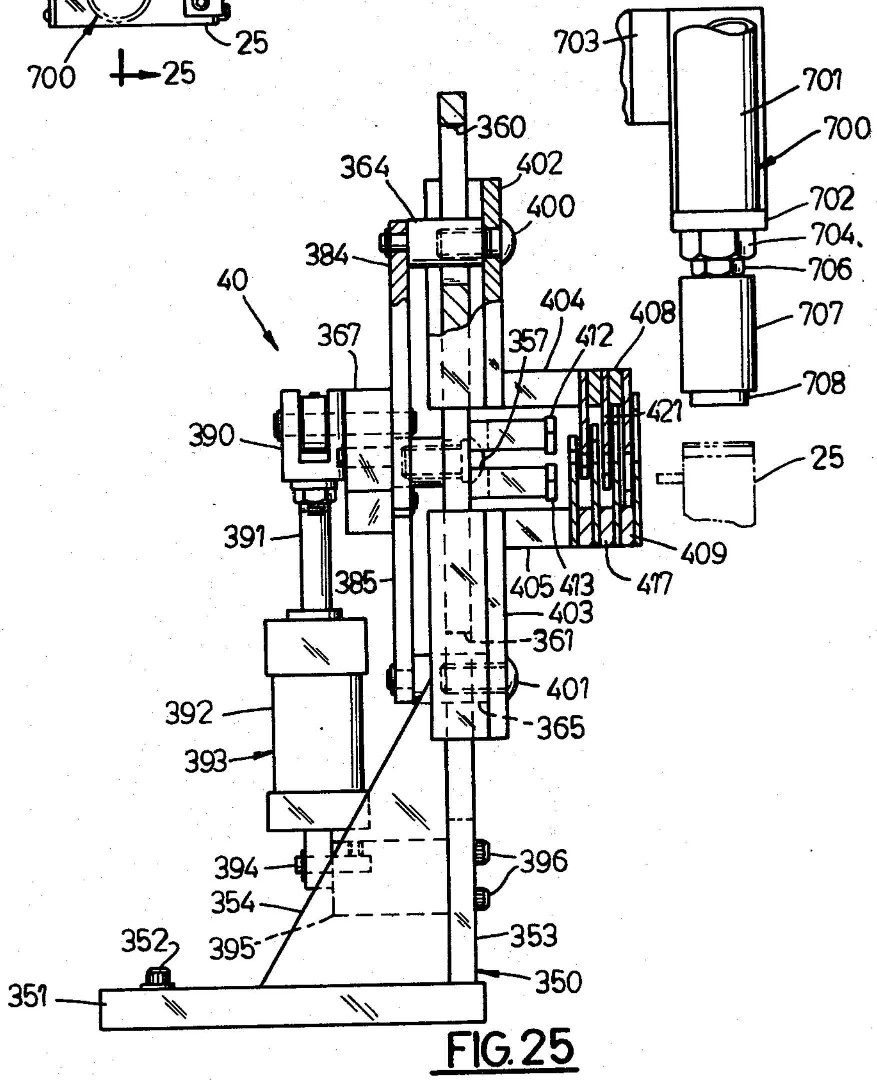
FIG. 25 is a cross-sectional view taken on line 25—25 of FIG. 24.

Upper wire gathering head 408 comprises three slotted wire gathering plates 420, 421, 422 which are mounted thereon by the screws 410 and spaced apart by spacer blocks 425 disposed between adjacent pairs of plates. The plates 420, 421, and 422, which are progressively longer in the vertical direction, each have four upwardly extending wire-receiving slots 430 extending upwardly from the lower edge thereof but each slot terminates in the same horizontal plane, as FIGS. 23 and 25 show. Lower wire gathering head 409 comprises four slotted wire gathering plates 440, 441, 442 which are mounted thereon by the screws 410 and spaced apart by spacer blocks 445 disposed between adjacent pairs of plates. The plates 440, 441, and 442, which are progressively longer in the vertical direction, each have four downwardly extending wire-receiving slots 451 extending downwardly from the upper edges thereof but each slot terminates in the same horizontal plane, as FIGS. 23 and 25 show.

Figure 22:
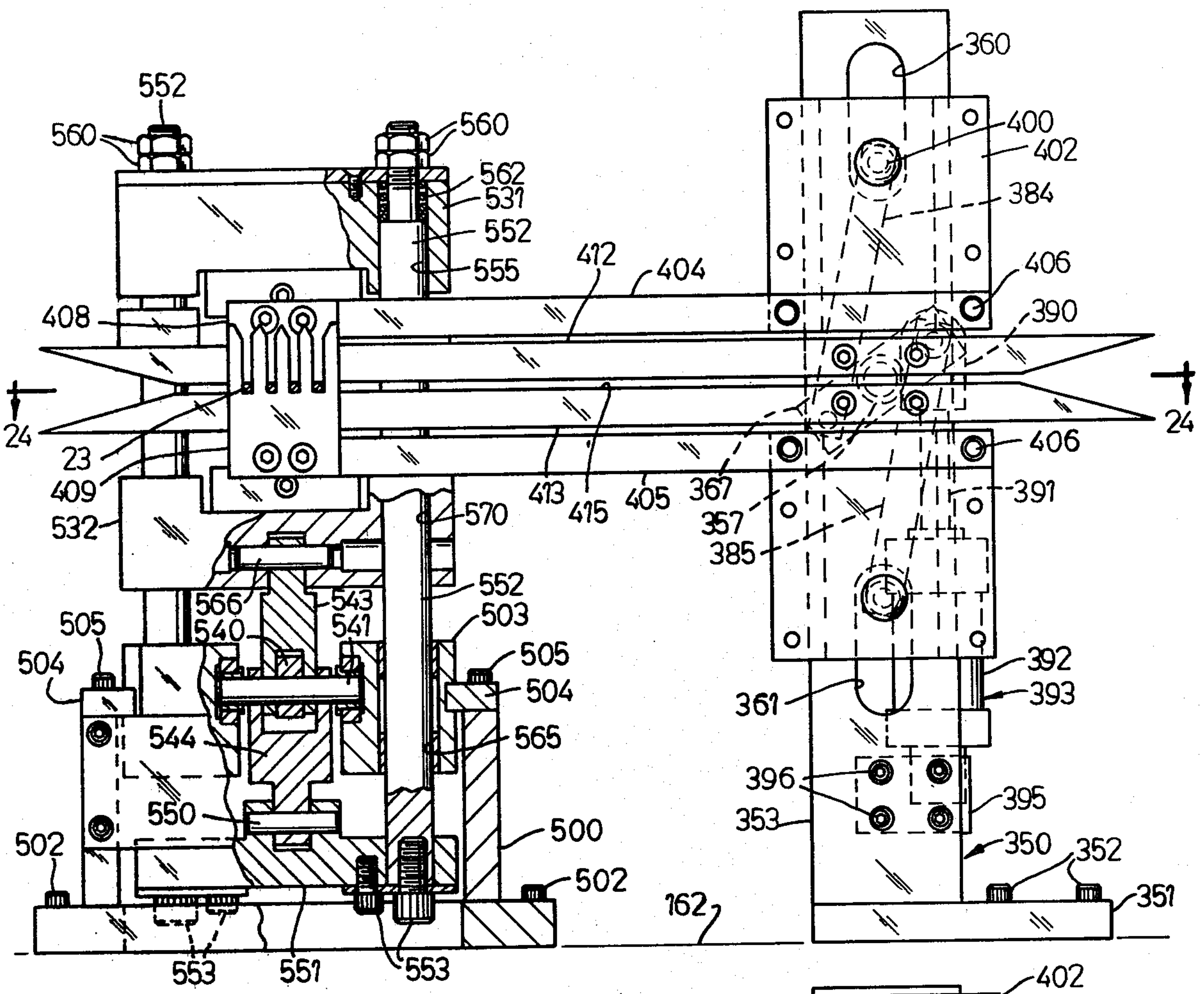
FIG. 22 is an enlarged side elevational view, partly in cross section, of a wire cutter and stripper mechanism and of a wire gathering mechanism therefor and is taken on line 22—22 of FIG. 1.
Figure 26:
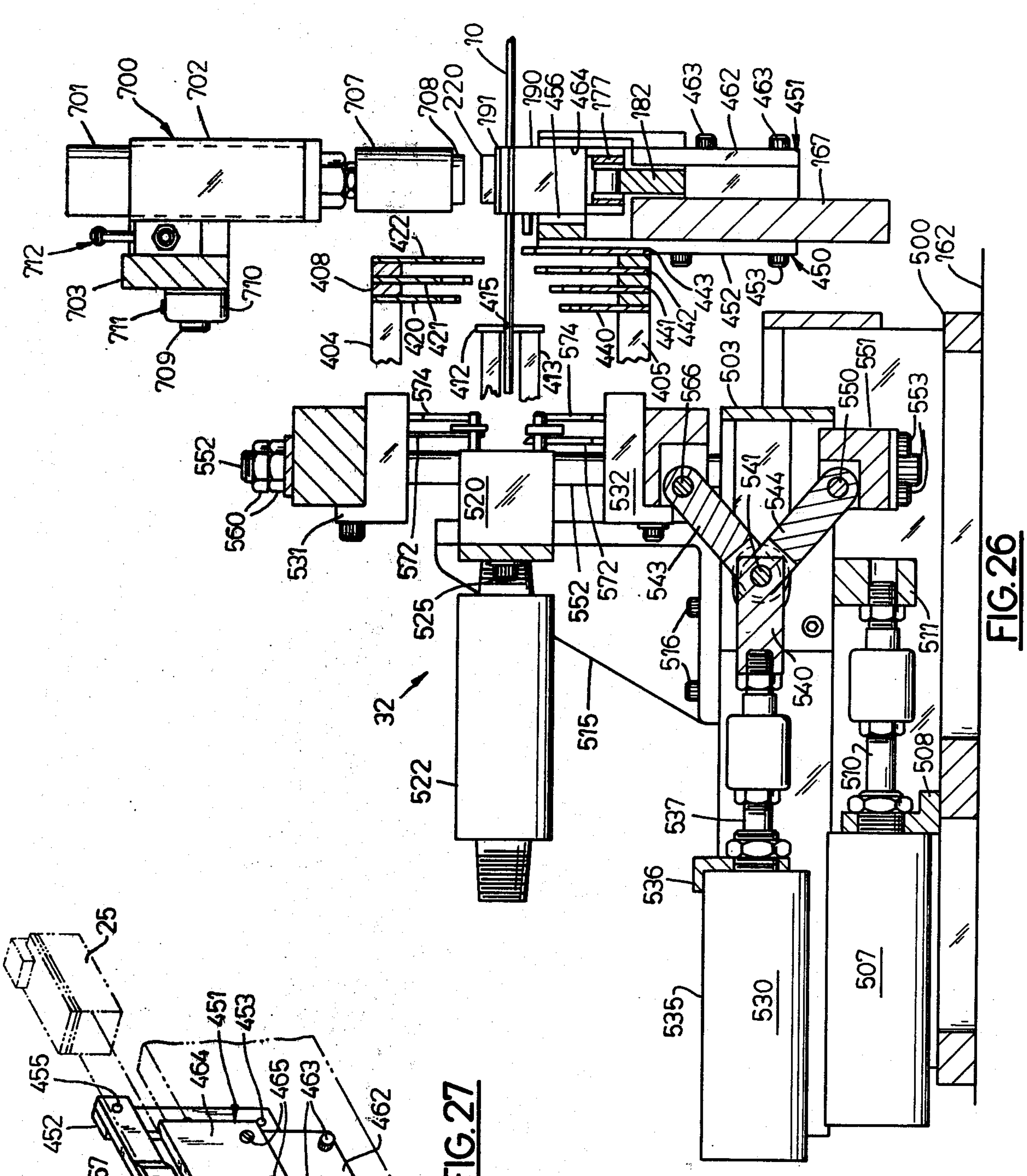
FIG. 26 is an enlarged view, partly in cross section, of the cutter and stripper mechanism and associated wire gathering mechanism taken on line 26—26 of FIG. 1.

The upper and lower wire gathering heads 408 and 409 have an open position shown in FIGS. 23 and 26 and are movable to a closed position shown in FIGS. 22 and 25. When in closed position, the wire gathering plates on the upper and lower heads intermesh, as shown in FIG. 25, and the slots in the upper and lower plates are in registry so that the ends of the four wire segments in a set 23 can extend therethrough into the wire cutting and stripping mechanism 40 as hereinafter explained. As FIG. 25 shows, when the upper and lower heads 408 and 409 are completely closed, the plates cooperate to define wire-receiving passages.

In operation, as a set 23 of wire segments is advanced in stages along conveyor mechanism 30 by the pair of clamps 25 and 26, the wire ends projecting from clamp 25 are guided into the wire guide slot 415 between the guide rails 412 and 413 and are thus given a preliminary alignment in a horizontal plane. The ends of the wire are advanced further along the slot 415 in stages and come to rest at one point in the cycle between the upper and lower wire gathering heads 408 and 409. At this point in the cycle, the pneumatic ram or motor 393 is timed to operate and the piston rod 391 extends upwardly thereby causing the pivot link 367 to rotate counterclockwise (with respect to FIGS. 22 and 23) from the position shown in FIG. 23 to the position shown in FIGS. 22 and 25. As this occurs, the upper and lower links 384 and 385 contract (i.e., move downwardly and upwardly, respectively) and cause the support plates 402 and 403, the support arms 405 and 406, and the upper and lower wire gathering heads 408 and 409, respectively, to move together toward each other. As the heads 408 and 409 come together, the ends of the four wire segments in the set 23, already positioned by the stationary wire guide rails 412 and 413, enter the four slots defined by the wire gathering heads. The wire gathering heads 408 and 409 cooperate in such a manner so as to gather the wire in heads 408 and 409 and accurately align the ends of the wire segments in spaced apart horizontal arrangement within the wire cutting and stripping mechanism 40 so that the latter mechanism can operate thereon as hereinafter described with great precision and accuracy. After the operating mechanism 40 has performed its function, as hereinafter described, the operating ram 393 is timed to operate and open the upper and lower wire gathering heads 408 and 409, respectively, thereby freeing the ends of the set 23 of the wire segments so that the set 23 can be further advanced by the pair of clamps 25 and 26 along the conveyor for further processing.

Figure 27:
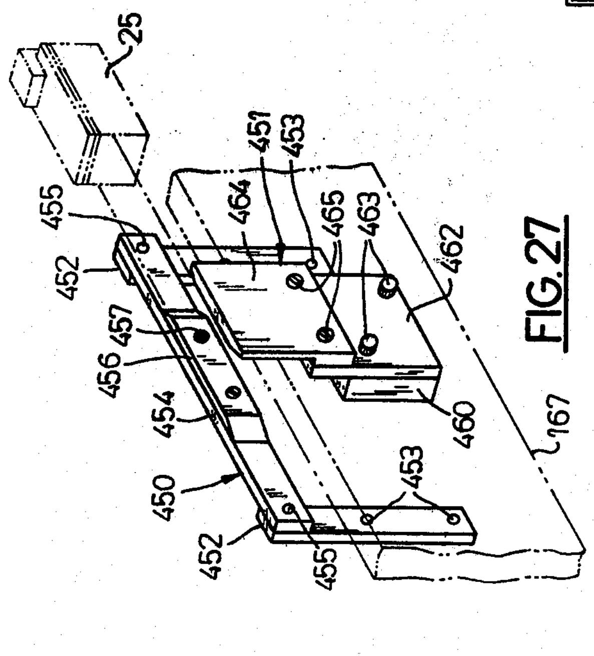
FIG. 27 is a perspective view of a portion of the wire gathering mechanism shown in FIG. 26.

As FIGS. 26 and 27 show, when clamp 25 moves to the position opposite the cutting and stripping mechanism 32 whereat the wire ends are grasped by the wire gathering mechanism 40, it is further desirable to prevent displacement of the conveyor clamp 25 in the axial direction of the set 23 of wire segments. Such axial movement of conveyor clamp 25 would otherwise be possible because the clamp is connected to the upper flight of the flexible conveyor chain 177 and the chain is slack enough to permit such displacement of the conveyor clamp unless otherwise prevented. Accordingly, means are provided to prevent such movement of conveyor clamp 25 and such means comprise a pair of spaced apart members 450 and 451 between which the conveyor clamp 25 comes to rest and a vertically operable hold-down mechanism 700 for the conveyor clamps 25 and 26, as FIGS. 24, 25, 26, and 28 show. Member 450 comprises a pair of upwardly extending support brackets 452 which are rigidly secured to conveyor side rail 167 by screws 453. A cross piece 454 is connected between the brackets 452 by screws 455. That side of the cross piece 454 facing one side of conveyor clamp 25 is provided with a ramp member 456 having sloped ends 464 which is secured to cross member 454 by screws 457. Member 451 comprises an upwardly extending support bracket 460 which is rigidly secured to the opposite side of the conveyor side rail 167 by screws 463. Another piece 462 is connected to the bracket 460 by the screws 463. That side of the piece 464 facing the other side of conveyor clamp 25 is provided with a ramp surface 456A having sloped ends 464A. The sloped ends of the member 456 and piece 464 facilitate entry of the conveyor clamp 25 therebetween and are so dimensioned so as to permit sliding passage of the conveyor clamp 25 therethrough but to prevent any significant axial displacement of the conveyor clamp and the set 23 of wires clamped therein during a cutting and stripping operation of the mechanism 32.

Figure 28:
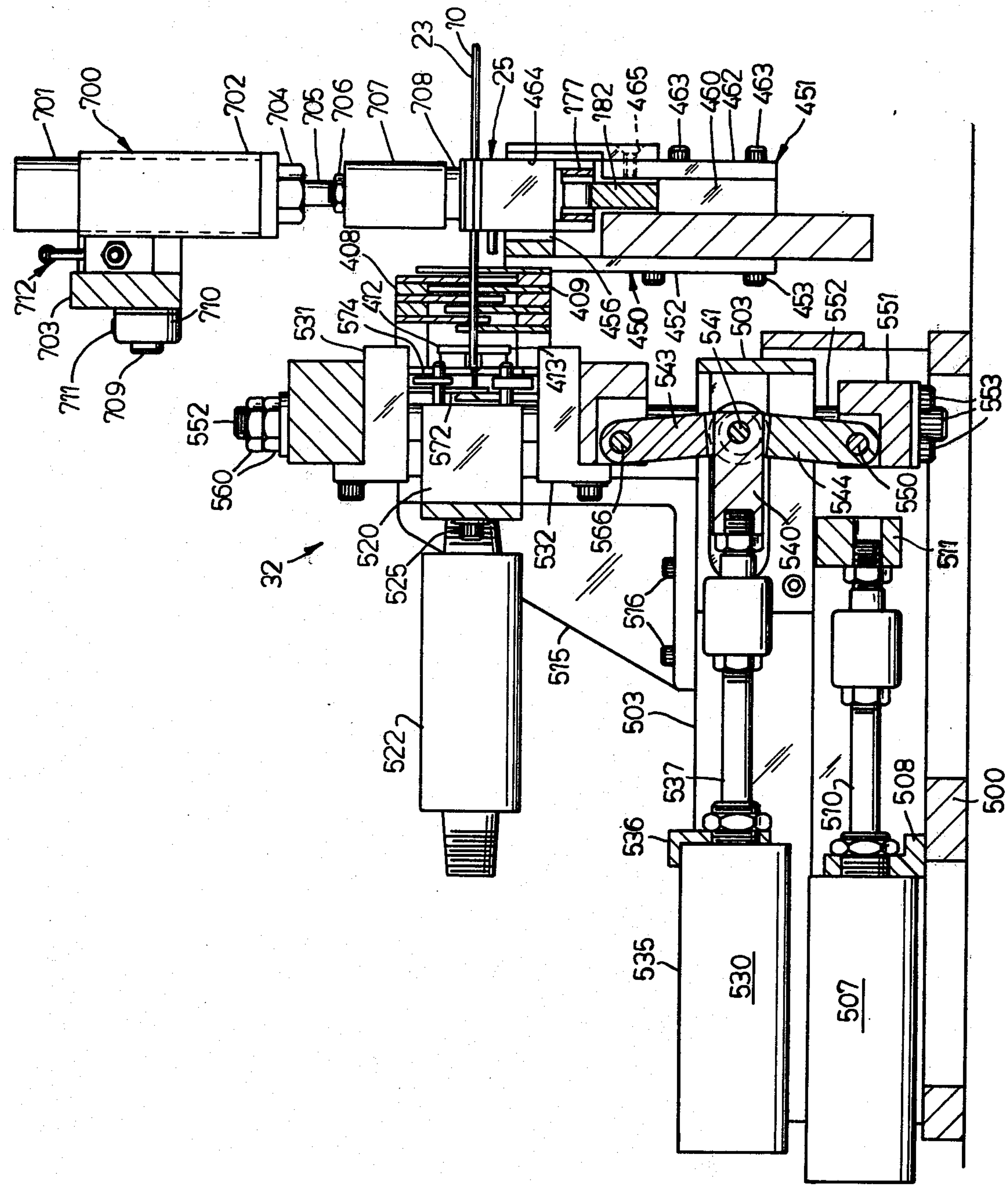
FIG. 28 is a view similar to FIG. 27 but showing the mechanisms in another operating position.

The hold-down mechanism 700 shown in FIG. 28, for example, is mounted on a support bracket 703 which is understood to be connected to the support on the member 162 of the conveyor 30. Mechanism 700 comprises a pneumatic cylinder 701 which is supported in a cylinder holder 702 and the latter is connected to a shaft 709 and is pivotable in a vertical plane. The shaft 709 is secured in position by a collar 710 having a set screw 711. The cylinder holder 702 includes a biasing mechanism 712 which tends to bias the housing in a downward direction. The pneumatic cylinder 701 is provided with a cylinder rod 705 which is connected to a plunger head 707. Plunger 707 is screwed to cylinder rod 705 and secured in desired position by a nut 706. A rubber pad 708 is secured as by gluing to the lower surface of the member 707. The cylinder 701 is secured in its holder 702 by means of a nut 704.

In operation, prior to movement of clamp 25 into the position wherein the set 23 of wires is to be operated upon, the pneumatic cylinder 701 is operated so that piston rod 705 and head 707 are retracted upwardly (with respect to FIG. 28). When the clamp 25 is in proper position and at rest, the pneumatic cylinder 701 causes piston rod 705 and head 707 to be extended downwardly for a short distance so that the resilient pad 708 engages the top of the clamp and exerts pressure thereon to prevent the set of wires 23 from being able to move in any direction between the jaws of the clamp. This aids in further securely clamping of the set of wires 23 to prevent axial movement while the wires are being stripped. When the ends of the wire segment have been operated upon and the clamp 25 is ready to resume its forward movement, the cylinder 701 effects retraction by upward vertical movement (with respect to FIG. 28) of piston rod 705 and head 707 thereby moving it clear of the clamp 25. As hereinbefore mentioned, the cylinder 701 is mounted in frame 702 which can pivot in a vertical plane and this is desirable to take into account any possibility of interference between head 707 and the conveyor clamp 25 due to loss of air pressure or timing. In other words, if the head 707 is struck by the top of the conveyor clamp 25, the hold-down mechanism 700 can pivot out of the path of travel if struck by the clamp, but tends to resume its normal position under the action of the biasing means 712.

The Wire Cutting and Stripping Mechanism

The wire cutting and stripping mechanisms 32 and 32A are identical in construction and mode of operation, and therefore, only mechanism 32 is hereinafter described in detail. As FIGS. 22, 24, 26, and 28 show, mechanism 32 is mounted on side frame 162 of conveyor mechanism 30. Mechanism 32 comprises a rigid stationary supporting frame 500 which is secured to frame 162 of conveyor 30 by bolts 502. Frame 500 supports a carriage 503 which is reciprocably slideable thereon (rightward and leftward in FIGS. 26 and 28) by means of guide rails 504 which are secured to frame 500 by screws 505. Carriage 503 is movable by means of a pneumatic ram 507 which has its cylinder rigidly secured to frame 500 by a bracket 508 and which has its movable piston rod 510 secured to a bracket 511 on the underside of carriage 503. Carriage 503 supports an upper frame 515 which is secured thereto by screws 516 and is movable therewith. Upper frame 515 supports a vacuum block 520 which has a cylindrical chamber 521 therethrough, which chamber communicates with a vacuum cylinder 522 which is screwed into a threaded passage 523 at the rear of block 520. Bolts 525 secure block 520 to frame 515. During operation, debris, such as stripped insulation and small fragments of wire, cut from the ends of the wire segments in set 23 are drawn into chamber 521 and from thence into vacuum cylinder 522 for subsequent disposal, thereby preventing the debris from interfering with proper operation of the cutter and stripping mechanism 32. Carriage 503 supports a pneumatic ram 530 which operates the upper and lower cutting and stripping heads 531 and 532, respectively. Cylinder 535 of ram 530 is rigidly secured as by a bracket 536 to carriage 503. Piston rod 537 of ram 530 is connected to a link 540 which in turn is connected by means of a link pin 541 to a pair of upwardly and downwardly extending links 543 and 544. As comparison of FIGS. 26 and 28 shows, retracting movement of the piston rod 537 of ram 530 causes the links 543 and 544 to draw together (see FIG. 26) and cause the upper and lower heads 531 and 532, respectively, to draw apart or open. Conversely, extension of piston rod 537 causes expansion of the links 543 and 544 (see FIG. 28) thereby causing the heads 531 and 532 to come together or close to effect a cutting operation. More specifically, the lower link 544 is connected by a pin 550 to a block 551 and a pair of cylindrical sliding rods 552 are secured to block 551 by screws 553 and extend upwardly therefrom. The upper head 531 comprises a pair of spaced apart rod-receiving holes 555 through which the rods 552 extend and the ends of the rods are threaded to receive nuts 560 which secure the head 531 to the rods. The upper end of each rod 552 is of smaller diameter than the main portion of the rod and a biasing spring 562 is disposed therearound. When block 551 is moved downward by link 544, the rods 552 move downward therewith, thereby causing the upper head 531 to move downward. There is slight relative movement possible between the head 531 and the end of the rods 552 for shock absorbing movement during operation but the biasing spring 562 tends to maintain the upper head 531 against the nuts 560 on rod 552. As FIG. 22 shows, the rods 552 are slideable in openings 565 in carriage 503 and partially supported therein. The lower head 532 is pivotally connected to link 543 by a pivot pin 566 and the lower head 532 is provided with openings 570 through which the rods 552 extend. In other words, lower head 532 is relatively slideable on the rods 552 as head 532 is moved upwardly or downwardly by link 543 in response to operation of ram 530. Each of the cutting and stripping heads 531 and 532 comprises a cutting blade 572 which effects a fine trim cut of the wire segments in set 23, as hereinbefore explained in connection with FIG. 3, and a stripping blade 574, which effects stripping of a predetermined amount of insulation from each wire segment in set 23.

In operation, when a set 23 of wire segments has been moved into proper position by the conveyor clamps 25 and 26 and the ends of the wire segments have been gripped by the wire gathering mechanism 40, as hereinbefore explained, the ram 507 is actuated to move the carriage 503 forward from the position shown in FIG. 26 to the position shown in FIG. 28 so that the ends of the wire segments in set 23 enter between the upper and lower heads 531 and 532 which are in the open position. When this occurs, the ram 530 is actuated to cause the links 543 and 544 to move from the position shown in FIG. 26 to that shown in FIG. 28 thereby causing the heads 531 and 532 to close. As the heads close, the trim-cutting blades 572 thereon come together to trim the ends of the wire segments simultaneously with closure of the knife blades 572 the stripper blades 574 come together and sever the insulation on the wire segments. At this point, the ram 530 is maintained in the extended position shown in FIG. 28 so that the stripping blades 574 remain closed but the other ram 507 is actuated to cause its piston rod and the carriage 503 attached thereto to move leftward from the position shown in FIG. 28 to the position shown in FIG. 26 thereby causing the stripping blades 574 to push the cut insulation off of the ends of the bare conductor wires, whereupon the cut insulation is drawn into the vacuum chamber 521 and into the vacuum housing 522. In actual operation, closure of the wire gathering mechanism 40, the forward extension of the carriage 503 and the closure of the cutting and stripping heads 531 and 532 occur simultaneously but in timed relationship so that the wire gathering mechanism holds the ends of the wire segments firmly in position by the time the cutting and stripping mechanism 32 performs its cutting and stripping operations. Similarly, the opening of the wire gathering mechanism 40 and the opening of the heads 531 and 532 on the cutting and stripping mechanism occur simultaneously in timed relationship. However, the leftward movement of carriage 503 must commence while the stripping blades 574 are closed in order to withdraw the cut insulation from the wire ends.

The Electrical Terminal Attachment Mechanisms

Figure 29:
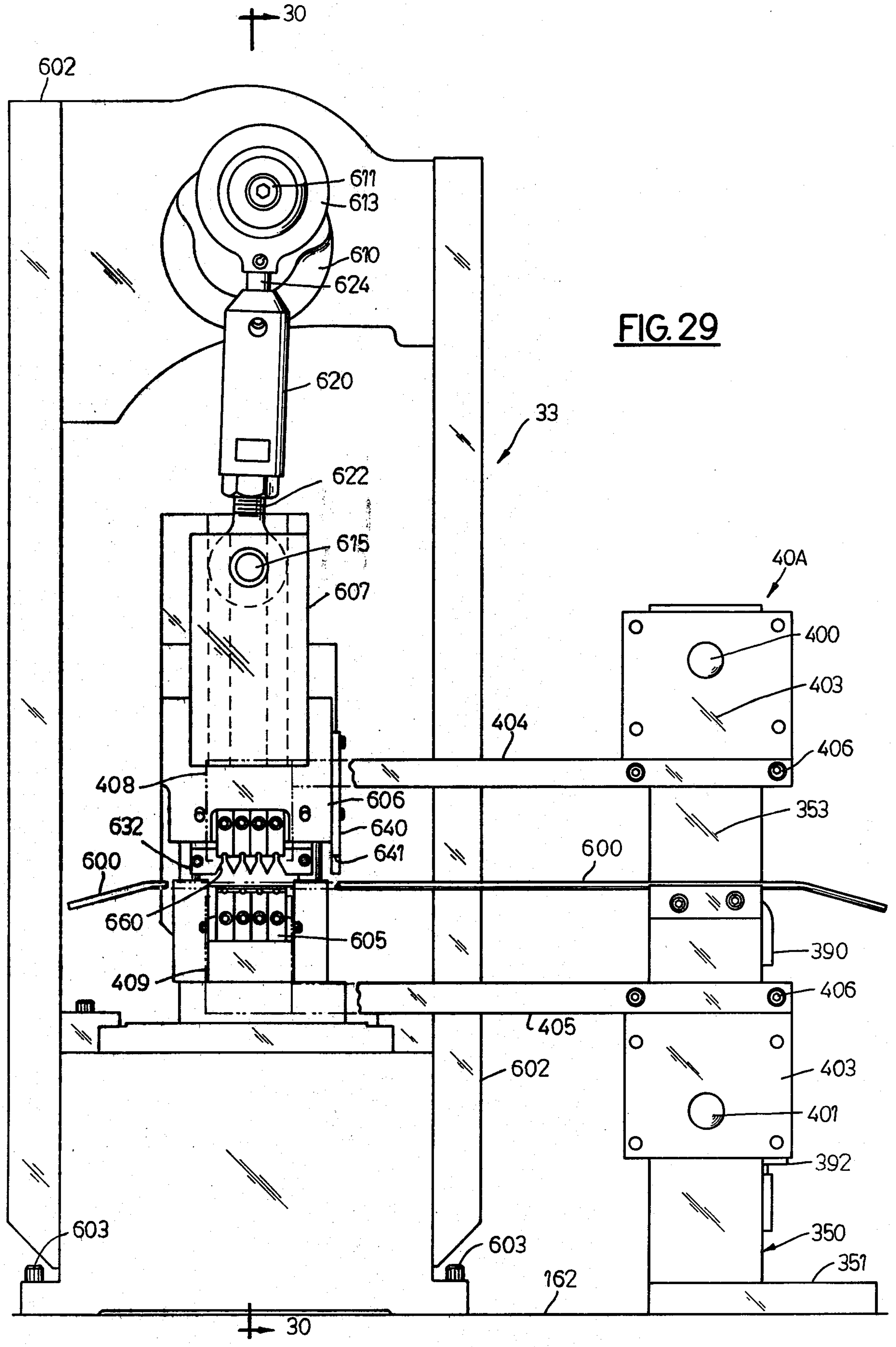
FIG. 29 is an enlarged elevational view of the terminal attachment mechanism taken on line 29—29 of FIG. 1.

The electrical terminal attachment mechanisms 33 and 33A are identical in construction and mode of operation. Therefore, only mechanism 33 is hereinafter described in detail. As FIGS. 1, 2, 29, 30, and 31 show, a wire gathering mechanism 40A is associated with terminal attachment mechanism 33. Mechanism 40A is similar in construction and mode of operation to the wire gathering mechanism 30 hereinbefore described but differs therefrom in that mechanism 40A is provided with a wire guide rail 600 in the form of a cylindrical wire rod having downwardly bent or sloped ends, instead of the guide rails 412 and 413 shown in FIGS. 22 and 23 in connection with mechanism 40. Terminal attachment mechanism 33 comprises a supporting framework 602 which is rigidly mounted as by screws 603 to side plate 162 of conveyor mechanism 30. Framework 602 rigidly supports a lower stationary platen 605 and a relatively movable terminal attachment head 606. The head 606 is mounted on a head block 607 which is reciprocably movable upwardly and downwardly by means of a rotatable driven shaft 610 which drives an eccentric pin 611. Eccentric pin 611 is pivotally connected to one end of a drive linkage 613 and the other end of the drive linkage is pivotally connected to a pin 615 which is mounted on block 607. Drive linkage 613 comprises a housing 620 having a passage 621 therethrough and the lower end of passage 621 is threaded to receive an eye bolt 622 which engages pin 615. Passage 621 also receives, through its upper end, the smooth shank of an eye bolt 624 which extends thereinto. As shaft 610 rotates and drives eccentric pin 611 in a circular path, the drive linkage 613, the head 607 attached thereto, and the head 606 attached to the block move reciprocably therewith. The head 606 carries a cutting blade 630, a crimping member 631, and a guide member 632. The head 606 also carries a member 640 which is reciprocably movable therewith and comprises a notch 641 which is periodically engageable with wire guide rail 600 to depress the latter as the head 606 descends so as to ensure that the ends of the wire segments in set 23 can drop down against the uncrimped portion 11C of a terminal which is to be attached thereto. As FIG. 29 shows, the guide member 632 has four notches 660 for receiving the four wires.

Figure 30:
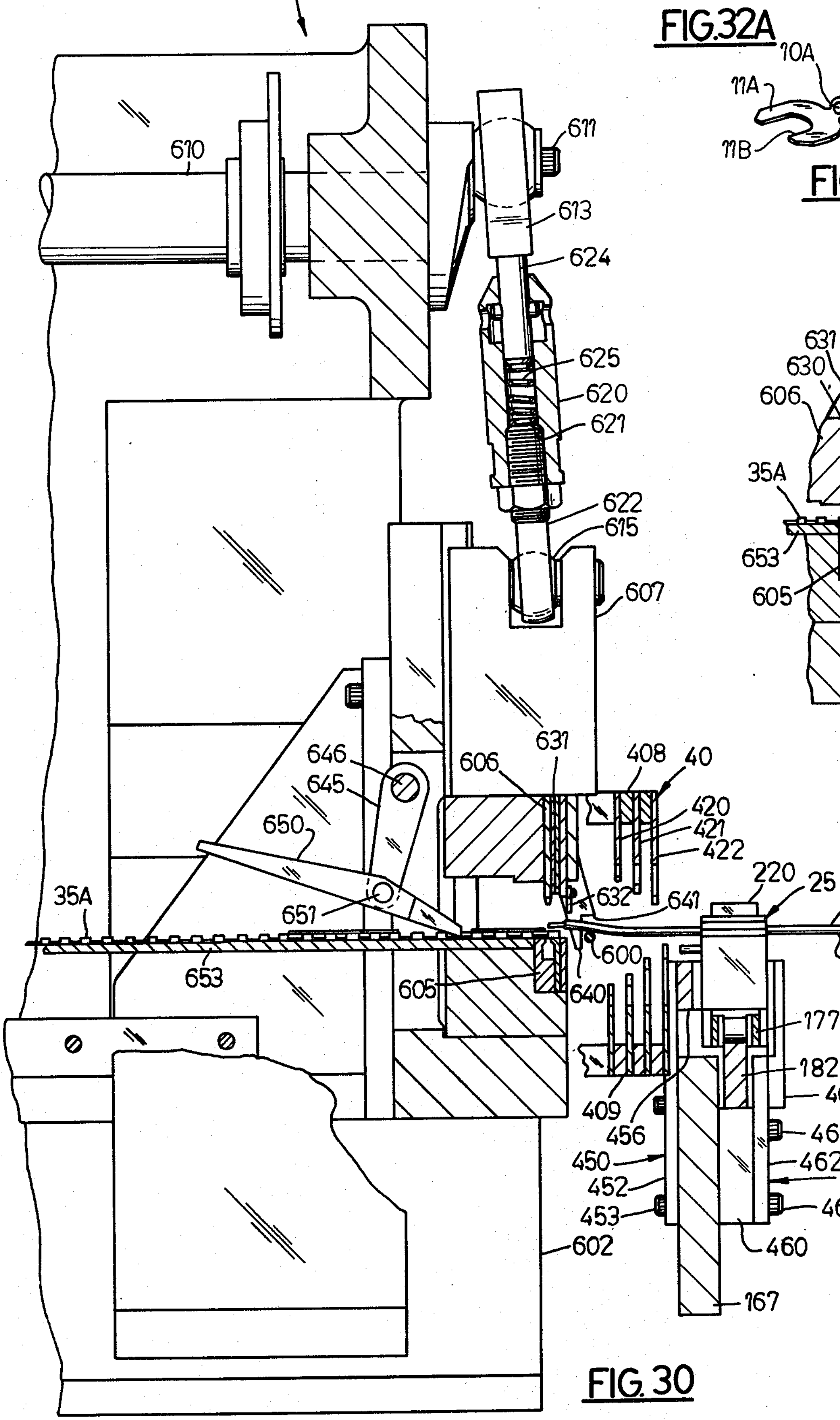
FIG. 30 is a cross-sectional view taken on line 30—30 of FIG. 29.

As FIG. 1 shows, four reels 35 feed four terminal strips 35A, 35B, 35C, and 35D to the terminal attachment mechanism 33. Since these terminal strips are identical, only terminal strip 35A is hereinafter described. As FIG. 32A shows, strip 35A comprises a succession of interconnected preformed terminals 11. Terminal attachment mechanism 33 comprises an oscillatably movable arm 645 which is mounted on and driven by an oscillatable shaft 646. A terminal strip advancement lever 650 is pivotally connected by a pin 651 to the end of the arm 645. The terminal strip 35A, which lies upon a plate 653 in mechanism 33, is advanced one terminal length at a time toward the platen 605 above which one of the wire segments is disposed as shown in FIG. 30. When the endmost terminal lies beneath the bare end of wire segment 10A, forward motion of terminal advancement lever 650 ceases and the head 606 and wire gathering mechanism 40A begin to close, moving from the position shown in FIG. 30 to that shown in FIG. 31. The feed of the terminal takes place in the first portion of the closing of the wire guides and press and is not a separate movement. As head 606 descends, the guide member 632 engages the insulated portion of the wire and ensures that it is properly positioned. The wire locating member 632 must locate the wire in the grooves before the ramp 600 starts to be depressed. The purpose of the ramp 600 is to press the wire into wire locating member 632. As head 606 descends even further, the crimping blades 631 bend the ferrule 11C around the lead 10 (compare FIGS. 32A and 32) and simultaneously therewith the cutting blade 630 severs the affixed terminal 11 from the terminal strip 35A. When the terminal 11 has been affixed, the terminal attachment mechanism 32 and the wire gathering mechanism 40A open and the set 23 of wire segments with terminals 11 attached are transported by the conveyor clamps 25 and 26 along the conveyor mechanism 30 toward the collecting station 34. Meanwhile, the terminal strip advancement lever 650 has retracted leftward with respect to FIG. 30. The feed of the terminal takes place at the first portion of the downward stroke. It is to be understood that the four terminal strips 35A, 35B, 35C, 35D are advanced simultaneously and affixed simultaneously to the four wire segments.

FIG. 33 is a chart showing the operating sequence of mechanisms comprising apparatus in accordance with the invention during one complete cycle operation. The chart identifies and describes the relative condition of the feed clamps, the cutting knives, the conveyor clamps, the cutting blades in wire cutting and stripping mechanism and the stripping blades in the wire cutting and stripping mechanism. It is to be understood that coordination of all components and mechanisms and apparatus in accordance with the invention is carried out in the sequence depicted in the chart 33 and as described in the specification by suitable drive mechanisms and control means for such drive mechanisms which are of conventional construction and, therefore, are not disclosed except to the extent necessary to explain the present invention, in order to avoid undue complication in the description.

We claim:

1. Apparatus for high-speed production of sets of accurately and identically sized wire leads comprising:
   conveyor clamp means including a body and a relatively movable jaw for releasably gripping a set of wire segments arranged in parallel spaced apart relationship in a common generally horizontal plane;
   at least one processing mechanism having means for performing a work operation on said set of wire segments;
   conveyor means for advancing said conveyor clamp means and moving said set of wire segments therein through said processing mechanism;
   and a wire gathering mechanism disposed between said clamp means and said processing mechanism, said processing mechanism having means for accurately guiding the ends of said set of wire segments relative to said processing mechanism and for holding the ends of said set of wire segments against displacement during the work operation thereon.

2. Apparatus according to claim 1 wherein said means for guiding the ends of said set of wire segments relative to said processing mechanism includes a releasably closable slotted gathering head for receiving and spacing the ends of said set of wire segments in said processing mechanism.

3. Apparatus according to claim 2 further including means for engaging said clamp means and for preventing horizontal lateral displacement thereof.

4. Apparatus according to claim 2 further including means for compressing said relatively movable body and jaw of said clamp means against said set of wire segments to prevent said work operation from effecting movement of said wire segments.

5. Apparatus according to claim 3 further including means for compressing said relatively movable body and jaw of said clamp means against said set of wire segments to prevent said work operation from effecting movement of said wire segments.

6. Apparatus for high speed production of sets of accurately and identically sized wire leads comprising:

conveyor clamp means including a body and a relatively movable jaw for releasably gripping a set of wire segments arranged in parallel spaced apart relationship in a common generally horizontal plane;

at least one processing mechanism having means for performing a work operation on said set of wire segments;

conveyor means for advancing said conveyor clamp means and moving said set of wire segments therein through said processing mechanism;

and a wire gathering mechanism disposed between said clamp means and said processing mechanism, said processing mechanism having means for accurately guiding the ends of said set of wire segments relative to said processing mechanism and for holding said set against displacement during processing, said gathering mechanism including guide means for guiding the ends of said set of wire segments into said processing mechanism, a releasably closable slotted gathering head for receiving and spacing the ends of said set of wire segments in said processing mechanism, means for engaging said clamp means and for preventing horizontal lateral displacement thereof, and means for compressing said relatively movable components of said clamp means against said set of wire segments to prevent said processing mechanism from effecting axial movement of said wire segments.

7. Apparatus according to claim 6 wherein said wire leads are insulated and wherein said processing mechanism is a cutter and stripper mechanism.

8. Apparatus according to claim 6 wherein said processing mechanism is a terminal attachment mechanism.

9. In combination:

a clamp having means for maintaining a plurality of wire segments in spaced apart parallel relationship in a common plane with free ends of said segments projecting from said clamp, said clamp comprising two relatively movable releasably latched components between which said segments are secured;

conveyor means for moving said clamp along a path which extends in the same general direction as said plane;

a cutter and stripper mechanism adjacent but spaced from said path and comprising cutter and stripper blades reciprocably movable in a direction transverse to said path and to said plane, said stripper blades being further movable in a direction toward and away from said path, said mechanism further comprising first means for effecting said reciprocable movement of said blades, said mechanism further comprising second means for effecting said further movement of said stripper blades;

and a gathering mechanism disposed between said cutter and stripper mechanism and said path, and including guide means for guiding the free ends of said wires into said cutter and stripper mechanism, a releasably closable slotted gathering head for receiving and spacing the free ends of said wire segments in said cutter and stripper mechanism, means for engaging said clamp and for preventing horizontal lateral displacement thereof, and means for compressing said relatively movable components of said clamp against said wire segments to prevent said stripper blades from effecting axial movement of said segments.

* * * * *